United States Patent
Watanabe

(10) Patent No.: US 8,565,580 B2
(45) Date of Patent: *Oct. 22, 2013

(54) RECORDING APPARATUS/METHOD/MEDIUM AND REPRODUCTION APPARATUS/METHOD

(75) Inventor: Akinobu Watanabe, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/086,420

(22) Filed: Apr. 14, 2011

(65) Prior Publication Data

US 2012/0002940 A1 Jan. 5, 2012

(30) Foreign Application Priority Data

Jun. 30, 2010 (JP) .................... 2010-148497

(51) Int. Cl.
*H04N 5/92* (2006.01)
*H04N 5/93* (2006.01)

(52) U.S. Cl.
USPC ............ 386/241; 386/E9.011; 386/E5.003

(58) Field of Classification Search
USPC .................... 386/241, E09.011, E05.003
See application file for complete search history.

(56) References Cited

U.S. PATENT DOCUMENTS 8,139,930 B2 * 3/2012 Ogawa et al. ............... 386/341
8,369,691 B2 * 2/2013 Watanabe .................... 386/326

FOREIGN PATENT DOCUMENTS

JP 2007-280496 10/2007

* cited by examiner

*Primary Examiner* — Thai Tran
*Assistant Examiner* — Girumsew Wendmagegn
(74) *Attorney, Agent, or Firm* — Antonelli, Terry, Stout & Kraus, LLP.

(57) ABSTRACT

An apparatus which easily discriminates 3D (stereoscopic vision) contents from non-3D contents among recorded program contents can be provided. Further, a unit to prohibit unintentional generation of a virtual play list where 3D contents and non-3D contents are mixed can be provided. For these purposes, a 3D flag is recorded in a play list file. Further, upon virtual play list generation, the recorded 3D flag set values are obtained and it is checked whether or not 3D contents and non-3D contents are mixed.

4 Claims, 26 Drawing Sheets

FIG. 2

| | |
|---|---|
| TYPE | 201 |
| VERSION NO. | 202 |
| PLAY LIST INFORMATION START ADDRESS | 203 |
| PLAY LIST MARK INFORMATION START ADDRESS | 204 |
| MAKER UNIQUE DATA START ADDRESS | 205 |
| USER INTERFACE APPLICATION INFORMATION | 206 |
| PLAY LIST INFORMATION | 207 |
| PLAY LIST MARK INFORMATION | 208 |
| MAKER UNIQUE DATA | 209 |

FIG. 3

| | |
|---|---|
| LENGTH | 301 |
| 3D FLAG | 331 |
| CHARACTER CODE | 302 |
| REPRODUCTION PROTECTION FLAG | 303 |
| RECORDING PROTECTION FLAG | 304 |
| REPRODUCTION COMPLETION FLAG | 305 |
| EDITING COMPLETION FLAG | 306 |
| TIME ZONE | 307 |
| RECORDING DATE AND TIME | 308 |
| PLAY LIST LENGTH | 309 |
| MAKER ID | 310 |
| MODEL CODE | 311 |
| CHANNEL NUMBER | 312 |
| CHANNEL NAME LENGTH | 313 |
| CHANNEL NAME | 314 |
| PLAY LIST NAME LENGTH | 315 |
| PLAY LIST NAME | 316 |
| PLAY LIST DETAIL LENGTH | 317 |
| PLAY LIST DETAIL | 318 |

| | AFTER GENERATION |
|---|---|
| PLAY LIST | 1301 |
| 3D FLAG | 1 |
| | 0 |

| | BEFORE DIVISION | AFTER DIVISION | 1751 |
|---|---|---|---|
| PLAY LIST | 1501 | 1611 | 1612 |
| 3D FLAG | 1 | 1 | 1 |
| | 0 | 0 | 0 |

| | BEFORE CONNECTION | | AFTER CONNECTION |
|---|---|---|---|
| PLAY LIST | 1811 | 1812 | 1921 |
| 3D FLAG | 1 | 1 | 1 |
| | 1 | 0 | 1 (WARNED)/–(CONNECTION INHIBITED) |
| | 0 | 0 | 0 |

2101 — REAL PLAY LIST
2103 — CLIP

|  | BEFORE DELETION | AFTER DELETION |
|---|---|---|
| PLAY LIST | 2101 | — |
| 3D FLAG | 1 | — |
|  | 0 | — |

2251

| | BEFORE PARTIAL DELETION | AFTER PARTIAL DELETION |
|---|---|---|
| PLAY LIST | 2301 | 2421 |
| 3D FLAG | 1 | 1 |
| | 0 | 0 |

2551

| | BEFORE PARTIAL DELETION | AFTER PARTIAL DELETION |
|---|---|---|
| PLAY LIST | 2601 | 2711 |
| 3D FLAG | 1 | 1 |
| | 0 | 0 |

FIG. 31

|  | BEFORE GENERATION | |
|---|---|---|
| PLAY LIST | 2901 | 2902 |
| 3D FLAG | 1 | 1 |
|  | 1 | 0 |
|  | 0 | 0 |

FIG. 32

|  | AFTER GENERATION | | |
|---|---|---|---|
| PLAY LIST | 3001 | 3002 | 3106 |
| 3D FLAG | 1 | 1 | 1 |
|  | 1 | 0 | 1 (WARNED)/–(GENERATION INHIBITED) |
|  | 0 | 0 | 0 |

FIG. 35

| | BEFORE GENERATION | |
|---|---|---|
| PLAY LIST | 3301 | 3302 |
| 3D FLAG | 1 | 1 |
| | 1 | 0 |
| | 0 | 0 |

| | AFTER GENERATION | | |
|---|---|---|---|
| PLAY LIST | 3301 | 3302 | 3406 |
| 3D FLAG | 1 | 1 | 1 |
| | 1 | 0 | 1 (WARNED)/–(GENERATION INHIBITED) |
| | 0 | 0 | 0 |

3652

RECORDING APPARATUS/METHOD/MEDIUM AND REPRODUCTION APPARATUS/METHOD

INCORPORATION BY REFERENCE

This application relates to and claims priority from Japanese Patent Application No. 2010-148497 filed on Jun. 30, 2010, the entire disclosure of which is incorporated herein by reference.

BACKGROUND OF THE INVENTION (1) Field of the Invention

The present invention relates to a recording apparatus/method/medium and a reproduction apparatus/method.

(2) Description of the Related Art

In digital broadcast, contents corresponding to 3D (stereoscopic vision) are broadcasted in 3D broadcast formats such as side-by-side format or top and bottom format. Note that in comparison with non-3D digital broadcast contents, techniques used in these methods cannot realize 3D broadcast without degradation of image quality (resolution, frame rate and the like). For example, in the side-by-side format, 3D representation is attained by reducing the horizontal resolution to ½.

On the other hand, recorders to record digital broadcast programs on a large capacity optical disc using blue laser and players to reproduce such optical disc holding digital broadcast programs are widely used. As the main purpose of these recorders and players is to record and to reproduce non-3D contents, it is considered that players for 3D contents will be popularized in the future.

SUMMARY OF THE INVENTION

Japanese Patent Application Laid-Open No. 2007-280496 proposes reproduction method for contents (especially still pictures and audio data) recorded on an optical disc and a data management method for a play list or the like on the optical disc.

In the conventional techniques, among recorded program contents, 3D (stereoscopic vision) contents or non-3D contents, it is impossible to easily discriminate the difference between these content types. Further, there is a problem that a virtual play list where 3D contents and non-3D contents are mixed is unintentionally generated.

The present invention addresses the above-described problems by recording a 3D flag in a play list file. Further, upon generation of virtual play list, a set value of a recorded 3D flag is obtained, so as to check whether or not 3D contents and non-3D contents are mixed.

The present invention has an advantage that it is possible to easily and quickly determine whether or not a program content is a 3D content by referring to a 3D flag from a play list file displayed as a recorded program list upon recording of 3D broadcast program contents. Further, generation of virtual play list where 3D contents and non-3D contents are mixed can be prevented.

BRIEF DESCRIPTION OF THE DRAWINGS

These and other features, objects and advantages of the present invention will become more apparent from the following description when taken in conjunction with the accompanying drawings wherein:

FIG. 2 is a table showing the structure of a play list file;

FIG. 3 is a table showing the structure of user interface application information;

FIG. 31 is a table showing the 3D flag before editing in the example of the assemble editing (non-seamless connection between two play items);

FIG. 32 is a table showing the 3D flag after the example of the assemble editing (non-seamless connection between two play items);

FIG. 35 is a table showing the 3D flag before the editing in the example of the assemble editing (seamless connection between two play items);

FIG. 36 is a table showing the 3D flag after the editing in the example of the assemble editing (seamless connection between two play items);

DETAILED DESCRIPTION OF THE PREFERRED EMBODIMENTS

Figure 1:
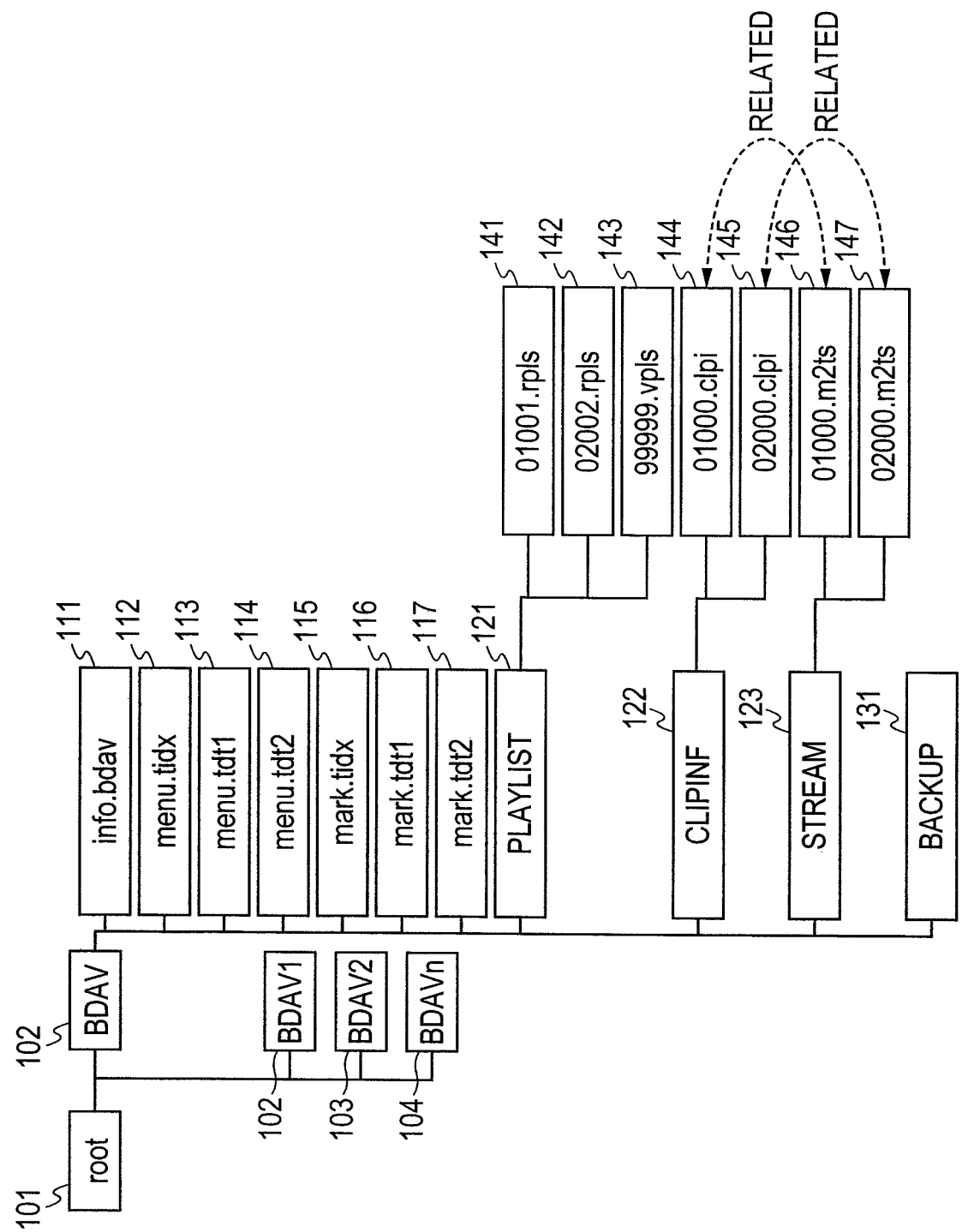
FIG. 1 is a block diagram showing a directory structure and a file structure.

FIG. 1 is a block diagram showing a directory structure and a file structure according to a method in an embodiment of the present invention.

Reference numeral 101 denotes a root directory including at least a BDAV directory 101.

Numeral 102 denotes a BDAV directory including a PLAYLIST directory 121, a CLIPINF directory 122, a STREAM directory 123, and a BACKUP directory 131.

The root directory 101 includes external BDAV directories such as a BDAV1 directory 102, a BDAV2 directory 103 and a BDAVn directory 104. Note that "n" of the BDAVn directory 104 is a natural number continued from 1 corresponding to the number of the external BDAV directories. For example, when four external BDAV directories exist under the root directory 101, "n" is 4, and the directories have directory names BDAV1, BDAV2, BDAV3 and BDAV4.

The PLAYLIST directory 121 includes management files such as real play list files 141 and 142 and a virtual play list 143.

The CLIPINF directory 122 includes management files such as clip information files 144 and 145.

The STREAM directory 123 includes stream files such as stream files 146 and 147.

A info.bdav file 111, which is a file holding general information, is stored in a BDAV directory.

A menu.tidx file 112 holds menu thumbnail header information.

A menu.tdt1 file 113 holds menu thumbnail picture data. A menu.tdt2 file 114 is a file similar to the menu.tdt1 file 113.

A mark.tidx file 115 holds mark thumbnail header information.

A mark.tdt1 file 116 holds mark thumbnail picture data. A mark.tdt2 file 117 is a file similar to the mark.tdt1 file 116.

A 01001.rpls file 141 includes information regarding a real play list. One rpls file is generated for one real play list. A 02002.rpls file 141 is a file similar to the 01001.rpls file 141.

A 99999.vpls file 143 includes information regarding a virtual play list. One vpls file is generated for one virtual play list.

A 01000.clpi file 144, which is a clip information file, includes clip information related to an AV stream file (a clip AV stream file or a bridge clip AV stream file). A 02000.clpi file 145 is a file similar to the 01000.clpi file 144.

A 01000.m2ts file 146, which is an AV stream file, includes an MPEG-2 transport stream. A 02000.m2ts file 147 is a file similar to the 01000.m2ts file.

A clip information file zzzzz.clpi, an AV stream file zzzzz and an m2ts file name "zzzzz", are 5 digit integers, and the same 5 digit integer is assigned to related clip information file and AV stream file.

Note that a clip information file zzzzz.clpi and an AV stream file zzzzz.m2ts, as a pair, are referred to as a clip.

In this manner, the play list is a file stored in the PLAYLIST directory.

Hereinbelow, the real play list file and the virtual play list file will be described in detail.

The real play list and the virtual play list have the following data.

FIG. 2 is a table showing the structure of a play list file.

Numeral 201 denotes a type identifier in which information indicating a play list file is stored. For example, when a value "PLST" is set with an ASCII code, it is possible to discriminate that the file is a play list file.

Numeral 202 denotes a version number indicating the version of the play list file. When a value code "0100" is set with an ASCII code, the value indicates that an H.264 stream is not referred to.

Numeral 203 denotes a play list information start address which is a value indicating a relative start position of play list information in a play list file in byte unit. The head starts from 0.

Numeral 204 denotes a play list mark information start address which is a value indicating a relative start position of play list mark information in the play list file in byte unit. The head starts from 0.

Numeral 205 denotes a maker unique data start address which is a value indicating a relative start position of maker unique data information in the play list file in byte unit. The head starts from 0. When 0 is set as this value, no maker unique data information exists.

Numeral 206 denotes user interface application information having a data structure as shown in FIG. 3.

Figure 5:
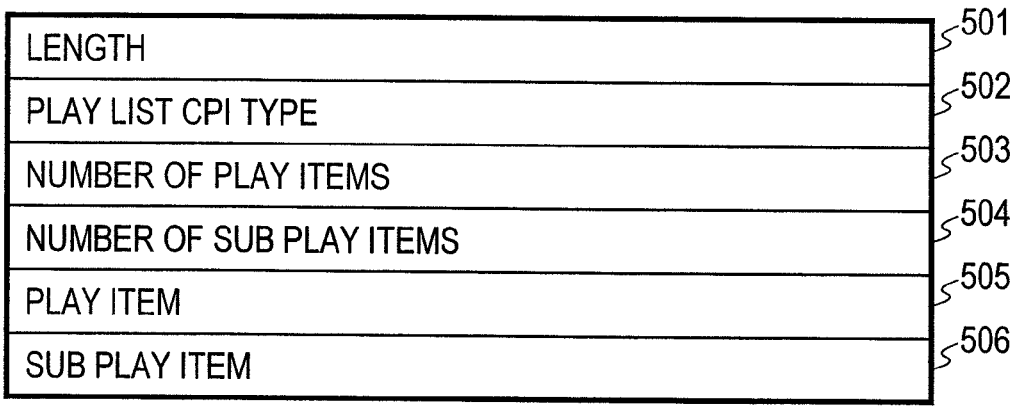
FIG. 5 is a table showing the structure of play list information.

Numeral 207 denotes play list information having a data structure as shown in FIG. 5.

Numeral 208 denotes play list mark information.

Numeral 209 denotes maker unique data.

FIG. 3 is a table showing the structure of the user interface application information. Parameters of a user interface application for the play list are stored.

Numeral 301 denotes a length indicating a length of the user interface application information immediately after a main field to the end of the information.

Numeral 331 denotes a 3D flag indicating, when 1 is set, that the contents included in the play list include a 3D (stereoscopic vision) content, on the other hand, when 0 is set, that include no 3D content.

Numeral 302 denotes a character code defining a character code used in a channel name 314, a play list name 316, and play list details 318. The character code is applied to a character code of a mark name in the play list mark information. For example, when 1 is set, Japanese is used; when 16 is set, ASCII code is used; and when 32 is set, Unicode is used.

Numeral 303 denotes a reproduction protection flag. When 1 is set, play list information such as a play list name or thumbnails and a play list are reproduced but not displayed for a user. When authentication by identification number input is successful, the play list can be reproduced. When 0 is set, reproduction can be performed without identification number input.

Numeral 304 is a recording protection flag. When 1 is set, play list information other than the recording protection flag is not changed nor deleted. When 0 is set, the user can freely change and/or delete the information. When 1 is set, before the user's deletion, editing and/or overwriting on the play list information, the recorder should ask the user to check the operation. In some cases, a real play list where the recording protection flag is set to 0 and a virtual play list where the recording protection flag is set to 1 share the same part of the clip. In this case, when the user is to delete the real play list, the recorder should again ask the user to check before the deletion of the real play list.

Numeral 305 denotes a reproduction completion flag. When 1 is set, the flag indicates that the play list has been reproduced at least once. When 0 is set, the flag indicates that the play list has never been reproduced.

Numeral 306 denotes an editing completion flag. When 0 is set, the flag indicates that original data upon recording is stored without any change, on the other hand, when 1 is set, indicates that the original data has been changed.

Figure 4:
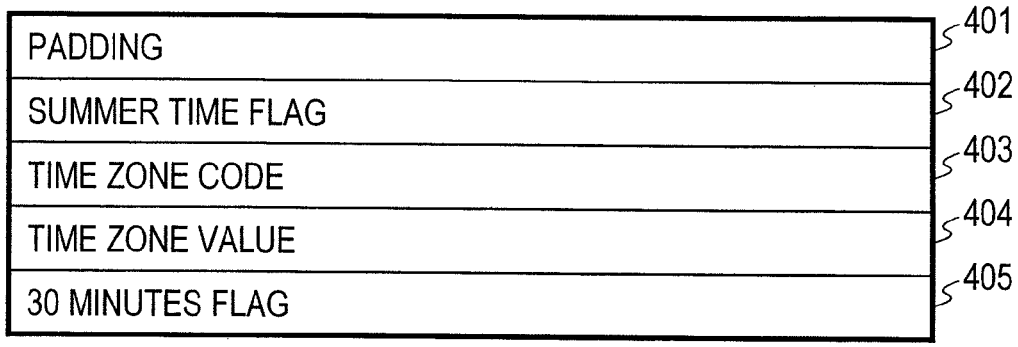
FIG. 4 is a table showing the structure of a time zone.

Numeral 307 denotes a time zone having a data structure as shown in FIG. 4.

FIG. 4 is a table showing the structure of time zone.

Numeral 401 denotes padding for alignment.

Numeral 402 denotes a summer time flag. When 0 is set, the flag indicates that it is standard time, on the other hand, when 1 is set, indicates that it is summer time.

Numeral 403 denotes a time zone code. When 0 is set, the code indicates a positive number, on the other hand, when 1 is set, indicates a negative number.

Numeral 404 denotes a time zone value. When 0 is set, the value indicating the absolute value of time difference from UTC (coordinated universal time). The unit is time (=60 minutes). When 15 is set, the time zone value is invalid, and indicates that the summer time flag, the time zone code and a 30 minutes flag are invalid.

Numeral 405 denotes the 30 minutes flag. When 1 is set, the flag indicates that the time zone value has further 30 minutes additional time difference as an absolute value. When 0 is set, the flag indicates that the time zone value has no additional time.

Numeral 308 denotes a recording date and time, including date and time information of recording of the play list, represented as local time "year/month/day/hour/minute/second" with a 4-bit 1-digit BCD (Binary Coded Decimal) number. The initial four digits correspond to the Christian Era year.

Numeral 309 denotes a play list length indicating the length of the play list in time unit. This is obtained as the sum of reproduction time of the play items included in the play list. The play item reproduction time is a time from IN time to OUT time. The unit is rounded up to second. The play list length represents hour/minute/second as a 4-bit 1-digit BCD number.

Numeral 310 denotes a maker ID indicating the maker of the recorder who last updated the play list.

Numeral 311 denotes a maker model code indicating a model number of the recorder who last updated the play list.

Numeral 312 denotes a channel number which is a broadcast channel number or a service number selected by the user upon recording of the play list. When two or more play lists are connected as one play list, this value indicates a representative value. The value of the channel number is 999 or smaller. When 0xFFFF is set, the number is invalid.

Numeral 313 denotes a cannel name length indicating the byte length of a channel name. The value of the channel name length is 20 or smaller.

Numeral 314 denotes a channel name which is a broadcast channel name or a service name selected by the user upon recording of the play list. In this field, the left end to the byte length indicated with the channel name length 313 is valid.

Numeral 315 denotes a play list name length indicating the byte length of a play list name. The value play list name length is 255 or smaller.

Numeral 316 denotes a play list name. In this field, the left end to the byte length indicated with the play list name length 315 is valid.

Numeral 317 denotes a play list detail length indicating the byte length of play list detail. The value of the play list detail length is a 1200 or smaller.

Numeral 318 denotes play list detail including detailed text information of the play list. In this field, the left end to the byte length indicated with the play list detail length 317 is valid.

FIG. 5 is a table showing the structure of the play list information.

Numeral 501 denotes a length indicating the length immediately after the field to the end of the play list information.

Numeral 502 denotes a play list CPI type, which is the type of an access point referred to from the IN time or OUT time in the play item, and is also the type of an access point of a mark time stamp in a play list mark. When 1 is set, the play list CPI type indicates that the respective access points in the play list information indicate display times in an AV stream file and referred to as EP_map type play list information. When 2 is set, the play list CPU type indicates arrival time and referred to as TU_map type play list information.

Numeral 503 denotes the number of play items indicating the number of play items in the play list. A play item ID is an integer which begins from 0. Entries of the play items in the play list are sorted in display order.

Numeral 504 denotes the number of sub play items indicating the number of sub play items in the play list.

Figure 6:
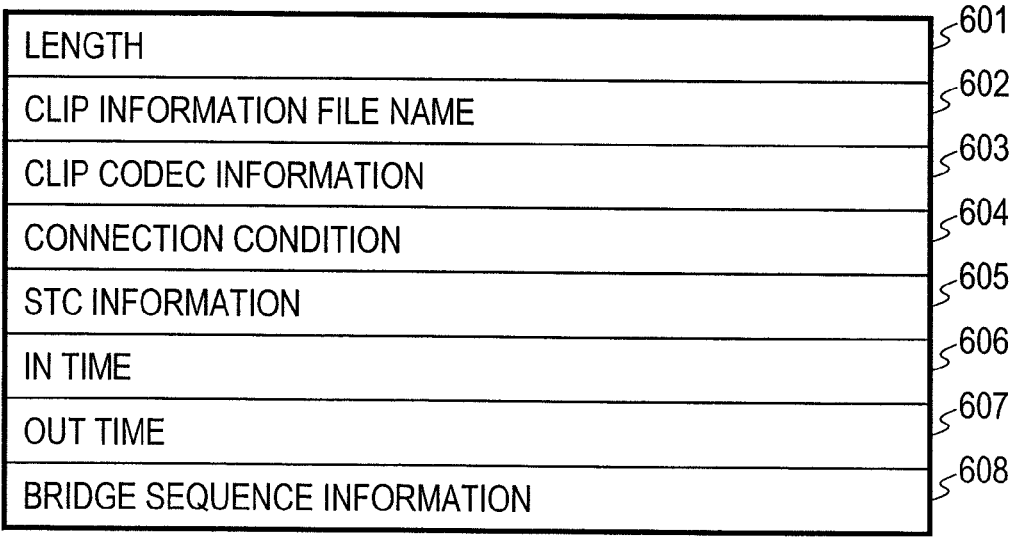
FIG. 6 is a table showing the structure of a play item.

FIG. 6 is a table showing the structure of the play item.

Numeral 601 denotes a length indicating the length immediately after the field to the end of the play item information.

Numeral 602 denotes a clip information file name indicating the clip information file name of a clip used in the play item information. This field shows a 5-digit number zzzzz of a file name zzzzz.clpi represented with an ASCII code character string. In the clip information file, a clip stream type field indicates a clip AV stream file (MPEG-2 transport stream).

Numeral 603 denotes a clip CODEC information. This field has a value indicating an ASCII code "M2TS". In the play list information, all the play items have clip CODEC information "MTS" with the same value. In the play list information, when the play list CPI type is set to 1 and the clip CODEC information is set to "M2TS", the respective clips used in the play list file have EP_map in the CPI information. When the play list CPI type in the play list information is set to 2 and the clip CODEC information is set to "M2TS", the respective clips used in the play list file have TU_map in the CPU information.

Numeral 604 denotes a connection condition indicating a connection condition between the IN time of a current play item and the OUT time of an immediately previous play item, with any one of values 1 to 6. When the play item is the first play item in the play list, the connection condition field is invalid and the value 1 is set.

Numeral 605 denotes STC information. When the CPI type in the clip information file is EP_map, the STC information 605 indicates STC_ID of an STC sequence including a presentation unit of the current play item. The clip referred to with the clip information file name of the current play item has the STC sequence. The value of the STC_ID is defined in the clip sequence information.

Numeral 606 denotes IN time indicating the IN time of the current play item, i.e., display start time of the current play item. The meaning of the IN time differs in accordance with CPI type in the CPI of the clip information file referred to with the clip information file name.

Numeral 607 denotes OUT time indicating the OUT time of the current play item, i.e., display end time of the current play item. The meaning of the OUT time differs in accordance with CPI type in the CPI of the clip information file referred to with the clip information file name.

In the case of EP_map, the IN time and the OUT time indicate display time, based on the STC time of the clip used in the play item, measured in 45 kHz clock unit. For example, the IN time and OUT time are represented with higher 32 bits of 90 kHz precision 33-bit PTS with respect to the presentation unit. Further, system time discontinuity point is not included from the IN time to the OUT time. Further, the OUT time indicates time ahead of the IN time. Note that upon lap around, the IN time value is greater than the OUT time.

In the case of TU_map, the IN time and OUT time indicate the time of TU_time_base the same as that in the ATC sequence of the clip referred to with the clip information file name of the play item. Further, the IN time and the OUT time are measured in 45 kHz clock unit. Further, the OUT time value is greater than the IN time.

Numeral 608 denotes bridge sequence information the details of which will be described in FIG. 7.

Figure 7:
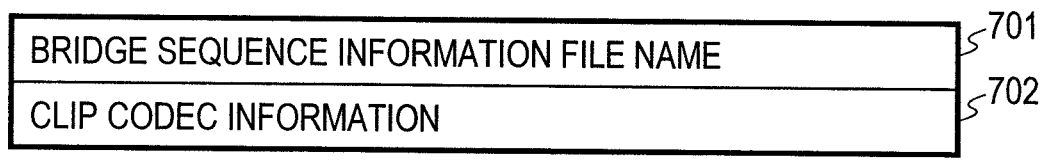
FIG. 7 is a table showing the structure of bridge sequence information.

FIG. 7 is a table showing the structure of the bridge sequence information.

Numeral 701 denotes a bridge sequence information file name indicating the name of a clip information file of a bridge clip used in the bridge sequence information. This filed includes a 5-digit numerical value (corresponding to zzzzz of a file name) described with an ASCII code. In the clip information of the clip information file, the clip stream type is a bridge clip AV stream (MPEG-2 transport stream).

Numeral 702 denotes clip CODEC information having an ASCII code "M2TS" value, indicating that the play list file uses an MPEG-2 transport stream. The bridge clip used in the bridge sequence information has EP_map as CPI.

Figure 8:
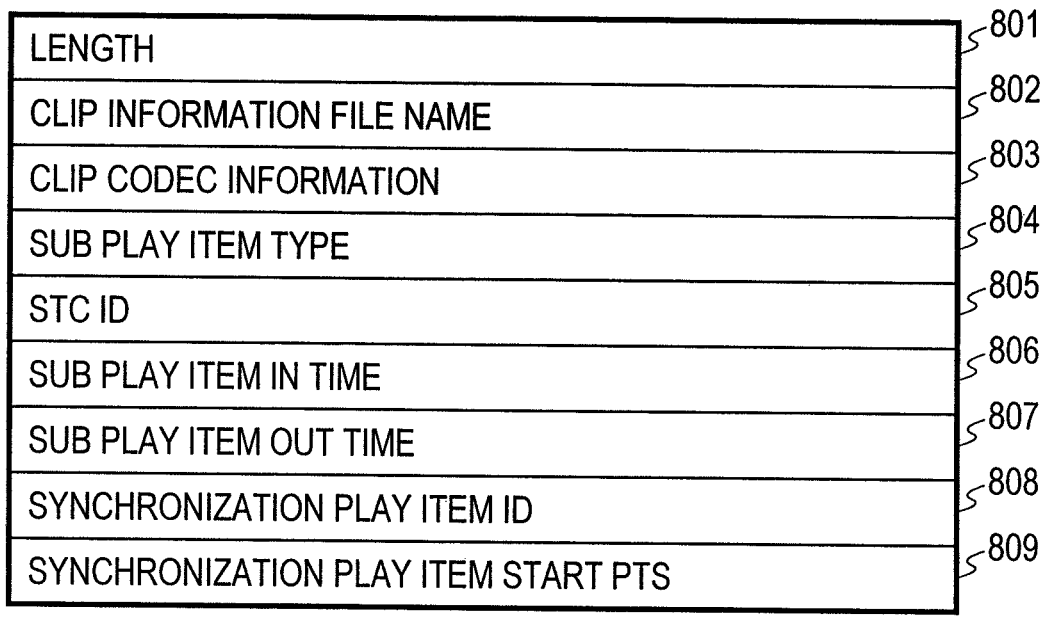
FIG. 8 is a table showing the structure of a sub play item.

FIG. 8 is a table showing the structure of a sub play item.

Numeral 801 denotes a length indicating the length Immediately after this field to the end of the sub play item.

Numeral 802 denotes a clip information file name indicating the name of a clip information file of a clip used in the sub play item. This field has a 5-digit number corresponding to the clip name zzzzz as an ASCII code. In the clip information of the clip information file, the clip stream type indicates "clip AV stream (MPEG-2 transport stream)".

Numeral 803 denotes clip CODEC information having a value "M2TS" as an ASCII code, indicating that an MPEG-2 transport stream is used in the play list file. The clip used in the sub play item has EP_map in the CPI.

Numeral 804 denotes a sub play item type indicating the type of a sub path used in the sub play item. Only a value 1 is set. The clip AV stream of after-recording sound stream is used.

Numeral 805 denotes an STC_ID indicating an STC_ID corresponding to the STC sequence of a clip indicated with a clip information file name referred to from the sub play item. In the sub play item, the both sub play item IN time and sub play item OUT time indicate a presentation unit in the same STC sequence referred to with the STC_ID.

Numeral 806 denotes sub play item IN time having a display start time of the sub play item. The sub play item IN time is display time measured in 45 kHz precision from the STC of the clip used in the sub play item.

Numeral 807 denotes sub play item OUT time having display end time of the sub play item. The sub play item OUT time is display time measured in 45 kHz precision from the STC of the clip used in the sub play item. The sub play item OUT time indicates time ahead of the sub play item IN time. When the STC laps around between the sub play item IN time and the sub play item OUT time, the sub play IN time value is greater than the sub play item OUT time. The both sub play item IN time and the sub play item OUT time indicate a display time between the display start time and the display end time corresponding to the STC sequence referred to with the STC_ID of the sub play item.

Numeral 808 denotes a synchronizing play item ID indicating a play item ID of the play item in the play list. This play item includes a sub play item. Reproduction of the sub play item started within the reproduction time of the play item. The play item ID is determined with the play list in the play list.

Numeral 809 denotes a synchronizing play item start PTS indicating display time in a play item specified with the synchronizing play item ID. When the display time of the play item comes to the synchronizing play item start PTS, the sub play item starts its display. The synchronizing play item start PTS is display time of a play item measured in 45 kHz clock unit specified with the synchronizing play item ID.

First, a recording apparatus will be described with reference to FIGS. 9 and 10.

Figure 9:
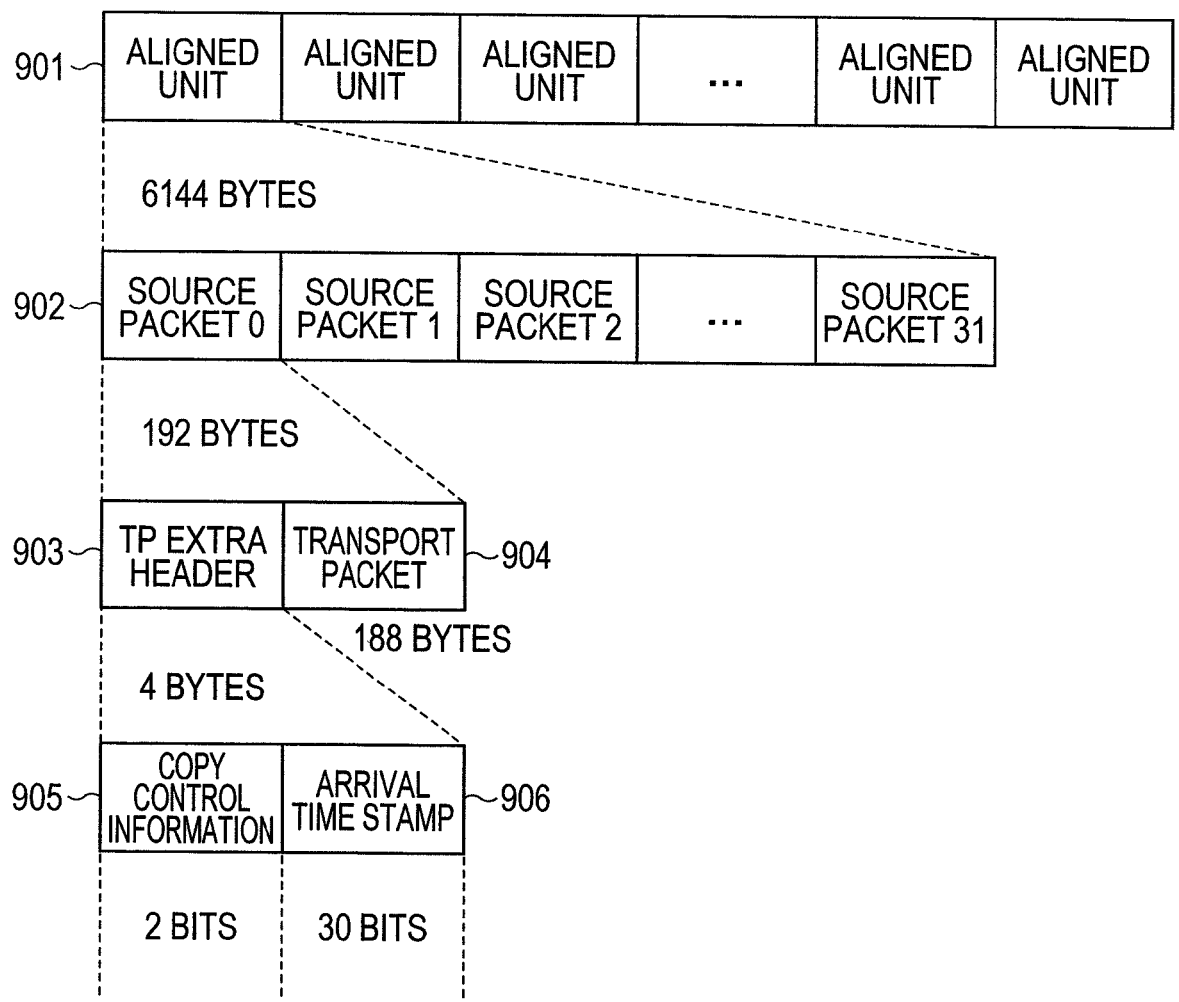
FIG. 9 illustrates the structure of an MPEG-2 transport stream.

FIG. 9 illustrates the structure of the MPEG-2 transport stream.

The AV stream file has the structure of the MPEG-2 transport stream. The MPEG-2 transport stream has a "natural number" of aligned units 901. The size of the aligned unit 901 is 6144 bytes (=2048×3 bytes). The aligned unit 901 starts from the initial byte of a source packet 902. The length of the source packet 902 is 192 bytes. One source packet has a TP extra header 903 and a transport packet 904. The length of the TP extra header 903 is 4 bytes, and the length of the transport packet 904 is 188 bytes. One aligned unit 901 has 32 source packets 902. The last aligned unit 901 in the MPEG-2 transport stream has 32 source packets 902. Accordingly, the MPEG-2 transport stream is terminated at the end of the aligned unit 901. When the last aligned unit 901 is not all filled with inputted transport stream, the remaining bytes are filled with PID=0x1FFF transport packet, i.e., a null source packet.

The transport packet 904 is defined in the ISO/IEC 13818-1.

The TP extra header 903 has a copy allowance information 905 and an arrival time stamp 906. The copy allowance information 905 includes content protection information of the related transport packet 904. In the arrival time stamp 906, the value of arrival time stamp to be described later is set.

Figure 10:
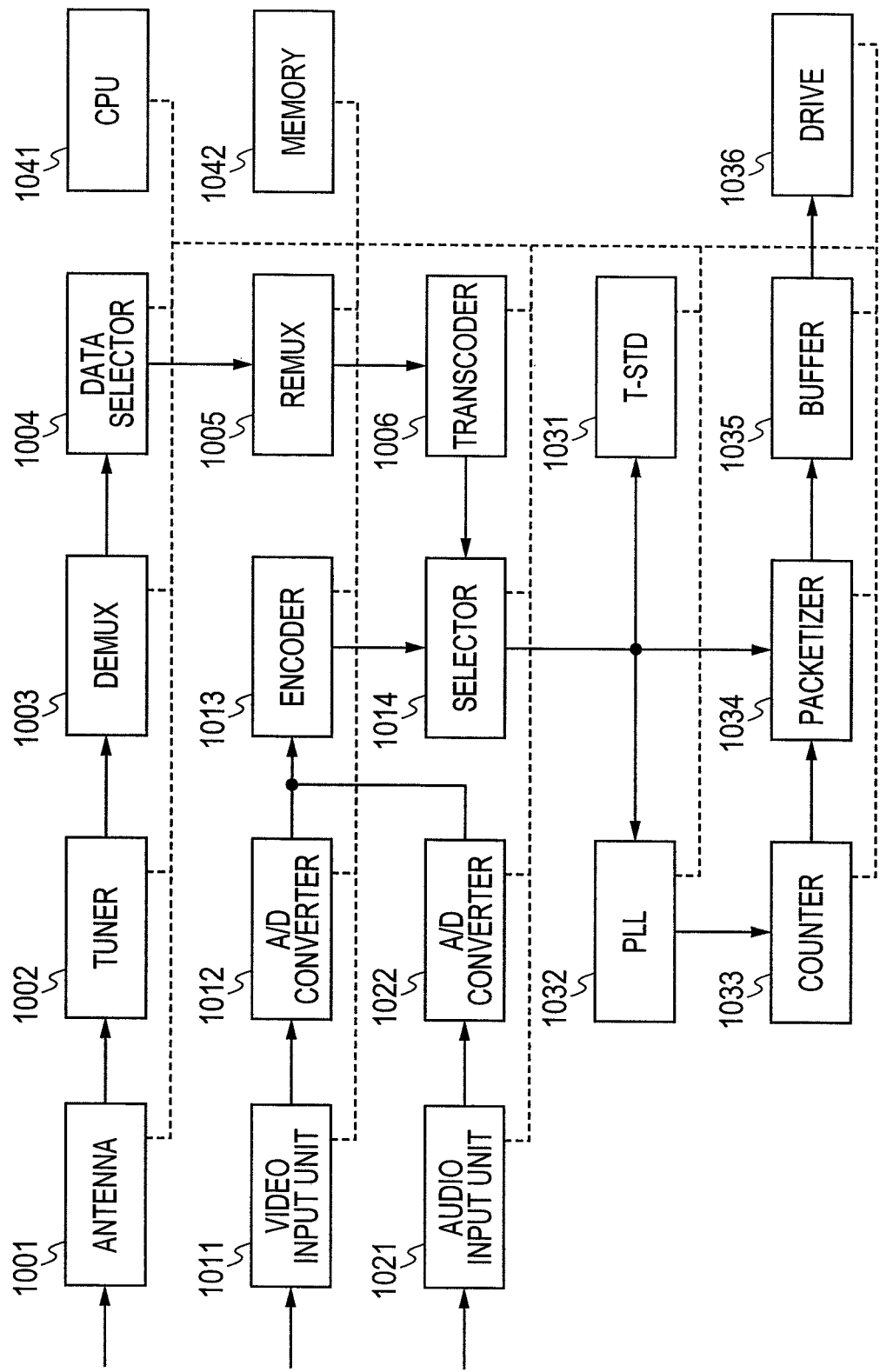
FIG. 10 is a block diagram of a recorder according to a method in an embodiment of the present invention.

FIG. 10 is a block diagram of a recorder in accordance with a method in an embodiment of the present invention.

Numeral 1001 denotes an antenna to input a digital broadcast wave.

Numeral 1002 denotes a tuner to receive the digital broadcast wave inputted from the antenna 1001.

Numeral 1003 denotes a DEMUX to separate the digital broadcast wave (full TS (Transport Stream)) received with the tuner 1002 into elementary streams in accordance with necessity.

Numeral 1004 denotes a data selector to select a necessary stream from the elementary streams separated with the DEMUX 1003 in accordance with necessity.

Numeral 1005 denotes a REMUX to multiplex the stream sent from the data selector over the MPEG-2 transport stream again in accordance with necessity, to obtain a partial TS (Transport Stream).

Numeral 1006 denotes a transcoder to convert the format of the TS audio stream and video stream inputted from the REMUX 1005 in accordance with necessity.

Numeral 1011 denotes a video input unit to input an analog video signal.

Numeral 1012 denotes an A/D converter to convert the analog data inputted from the video input unit 1011 into digital data.

Numeral 1021 denotes an audio input unit to input an analog audio signal.

Numeral 1022 denotes an A/D converter to convert the analog data inputted from the audio input unit 1021 into digital data.

Numeral 1013 denotes an encoder to encode the video data and the audio data, digitized with the A/D converters 1012 and 1022, into an MPEG-2 transport stream.

Numeral 1014 denotes a selector to selectively input the stream sent from the transcoder 1006 or the encoder 1013.

Numeral 1031 denotes a T_STD (transport system target decoder) to input the MPEG-2 transport stream at time i.

Numeral 1032 denotes a PLL at a frequency of 27 MHz synchronized with a PCR (Program Clock Reference) of the input MPEG-2 transport stream.

Numeral 1033 denotes a binary counter to count a pulse signal at a frequency of 27 MHz. The counter 1033 delivers a count value i at the time i as an arrival time clock (i) to a packetizer 1034.

Numeral 1034 denotes the packetizer to add the TP extra header to all the transport packets to generate a source packet stream and an aligned unit. The generated source packet stream is transferred to a write buffer 1035 at a maximum transfer rate RMAX. The packetizer 1034 has a small capacity buffer inside to average the bit rate of the stream. In some cases, the peak rate of digital broadcast exceeds the RMAX, but the RMAX or lower rate is ensured as the transfer rate to the write buffer 1035 with the internal buffer.

The arrival time stamp is time of arrival of the initial byte of the source packet at the T_STD 1031 and the packetizer 1034. The arrival time stamp (k) is a arrival time clock (k) sample value (see the following expression).

$$\text{arrival time tamp}(k) = \text{arrival time clock}(k) \% (2^{30})$$

The maximum value of a difference between the arrival time stamps of two continuous packets is $(2^{30}-1)/27000000$ seconds (=about 40 seconds).

When the difference exceeds this value, the arrival time stamp is changed such that the difference becomes this maximum value. It is necessary to set the recorder in consideration of such case. When an MPEG-2 transport stream player to be described later outputs a transport stream in correspondence with the arrival time stamp, the PCR precision of the outputted transport stream is defined in the ISO/IEC13818-9.

Numeral 1035 denotes a buffer as a write buffer to write a source packet transferred from the packetizer 1034 into a drive 1036.

The value of the RMAX is determined by a TS recording rate defined in the clip information of an AV stream file. The RMAX is calculated as follows.

$$RMAX = TS \text{ recording rate} \times 192/188$$

The unit of the TS recording rate is byte/sec.

When a maximum recording rate of the drive is RUD and the buffer 1035 is not blank, the recording rate to the drive 1036 is RUD. When the buffer 1035 is blank, the recording rate to the drive 1036 is 0. The buffer 1035 does not overflow.

Numeral 1036 denotes the drive to write the stream inputted from the write buffer 1035 on a recording medium such as an optical disc at the maximum recording rate RUD.

Numeral 1041 denotes a CPU to perform recording control on the entire recorder. The CPU is connected to the respective blocks in the recorder via a CPU bus as indicated with a broken line, to perform data transmission/reception and control.

Numeral 1042 denotes a memory used as a work memory for the CPU 1041 or a buffer for the encoder, or the like.

Figure 37:
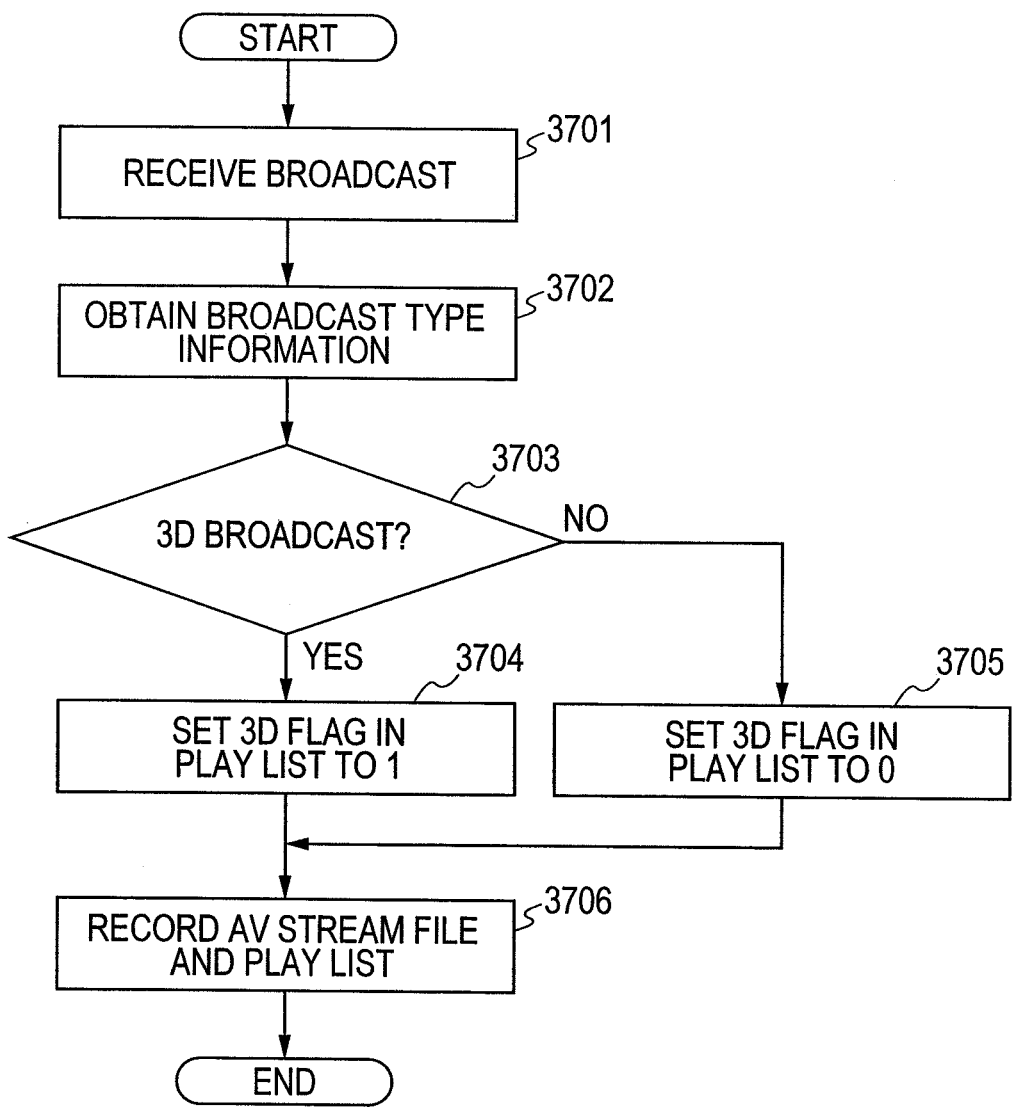
FIG. 37 is a flowchart showing 3D flag recording processing.

Further, the flow of 3D flag recording processing will be described with reference to FIG. 37.

When recording of a broadcast program is started, stream data of the program received/tuned with the tuner 1002 via the antenna 1001 is separate-processed with the DEMUX 1003 (step 3701).

Then, the CPU 1041 obtains program attribute information indicating whether or not the program is a 3D broadcast program included in SI information via the data selector 1004 (step 3702).

The CPU 1041 determines, based on whether the obtained information is 3D information, whether or not the program is a 3D content program (step 3703), and calculates a value to be set in a 3D flag 331 in the user interface application information 206 in the play list file 141. When the recorded program is a 3D broadcast program, 1 is set, otherwise, 0 is set (step 3704 or step 3705). The CPU 1041 records the playlist file 141, together with the AV stream file 146 and the clip information file 145, on a recording medium with the drive 1036 (step 3706).

Next, a reproduction apparatus will be described with reference to FIG. 11.

Figure 11:
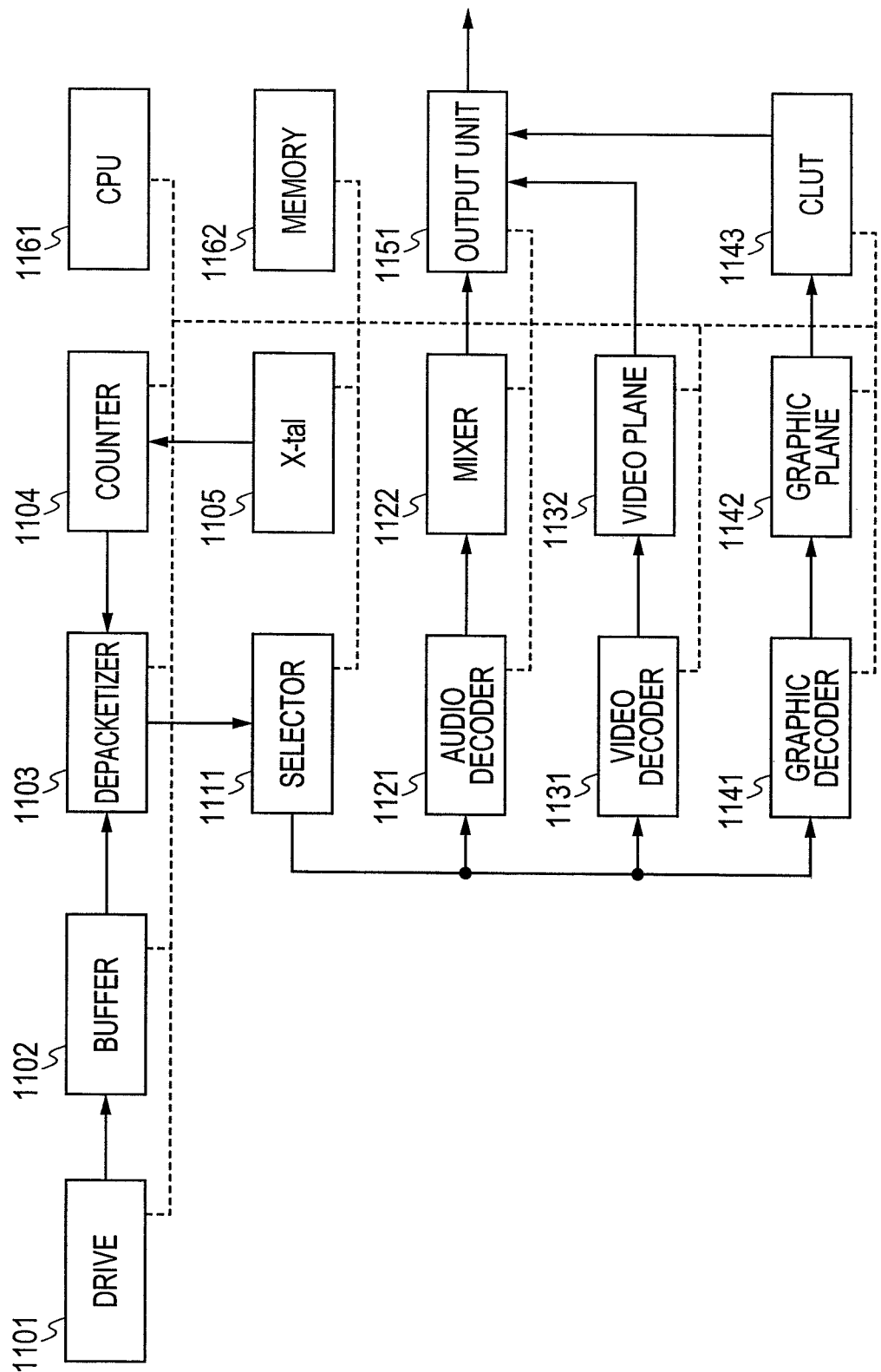
FIG. 11 is a block diagram of a player in accordance with the method in the embodiment.

FIG. 11 is a block diagram of a player in accordance with the method in the embodiment of the present invention.

Numeral 1101 denotes a drive to read an MPEG-2 transport stream from a recording medium such as an optical disc and transfers the MPEG-2 transport stream to a buffer 1102.

Numeral 1102 denotes the buffer to perform buffering on the MPEG-2 transport stream read from the drive 1101.

Numeral 1103 denotes a depacketizer to separate the MPEG-2 transport stream inputted from the buffer 1102 into TP extra header and transport packet, and outputs the transport packet with the arrival time stamp in synchronization with the arrival time clock inputted from a counter 1104. The initial value of the arrival time clock is first delivered to the counter 1104.

Numeral 1104 denotes the counter to start counting of a 27 MHz pulse signal from an X-tal 1105 from the initial value received from the depacketizer 1103, and delivers the arrival time clock to the depacketizer 1103.

Numeral 1105 denotes the X-tal to generate a 27 MHz pulse signal.

Numeral 1111 denotes a selector to select the transport packet inputted from the depacketizer 1103 by type, and delivers the transport packet to a corresponding decoder.

Numeral 1121 denotes an audio decoder to decode an audio packet inputted from the selector 1111 and delivers the decoded audio packet to a mixer 1122.

Numeral 1122 denotes the mixer to perform mixing such as multi-channel audio volume setting at designated rate in accordance with necessity.

Numeral 1131 denotes a video decoder to decode a video packet inputted from the selector 1111 and delivers the decoded data to a video plane 1132.

Numeral 1132 denotes the video plane to develop the picture data decoded by the video decoder 1131 and displays the picture data.

Numeral 1141 denotes a graphic decoder to decode a graphic packet inputted from the selector 1111 and delivers the decoded data to a graphic plane 1142.

Numeral 1142 denotes the graphic plane which is a plane buffer to develop the graphic data inputted from the graphic decoder 1141.

Numeral 1143 denotes a CLUT (Color Look Up Table) for reference to RGB and alpha-blend data corresponding to respective pixels in the graphic plane 1142.

Numeral 1151 denotes an output unit to multiplex inputted audio/video/graphic data and output the multiplexed data in an analog format such as YCbCr or a digital format such as HDMI from the player to the outside.

Numeral 1161 denotes a CPU for reproduction control of the entire player. The CPU 1161 is connected to the respective blocks in the recorder via a CPU bus indicated with a broken line, and performs data transmission/reception and control.

Numeral 1162 denotes a memory used as a work memory for the CPU 1161, a decoder buffer and the like.

Figure 38:
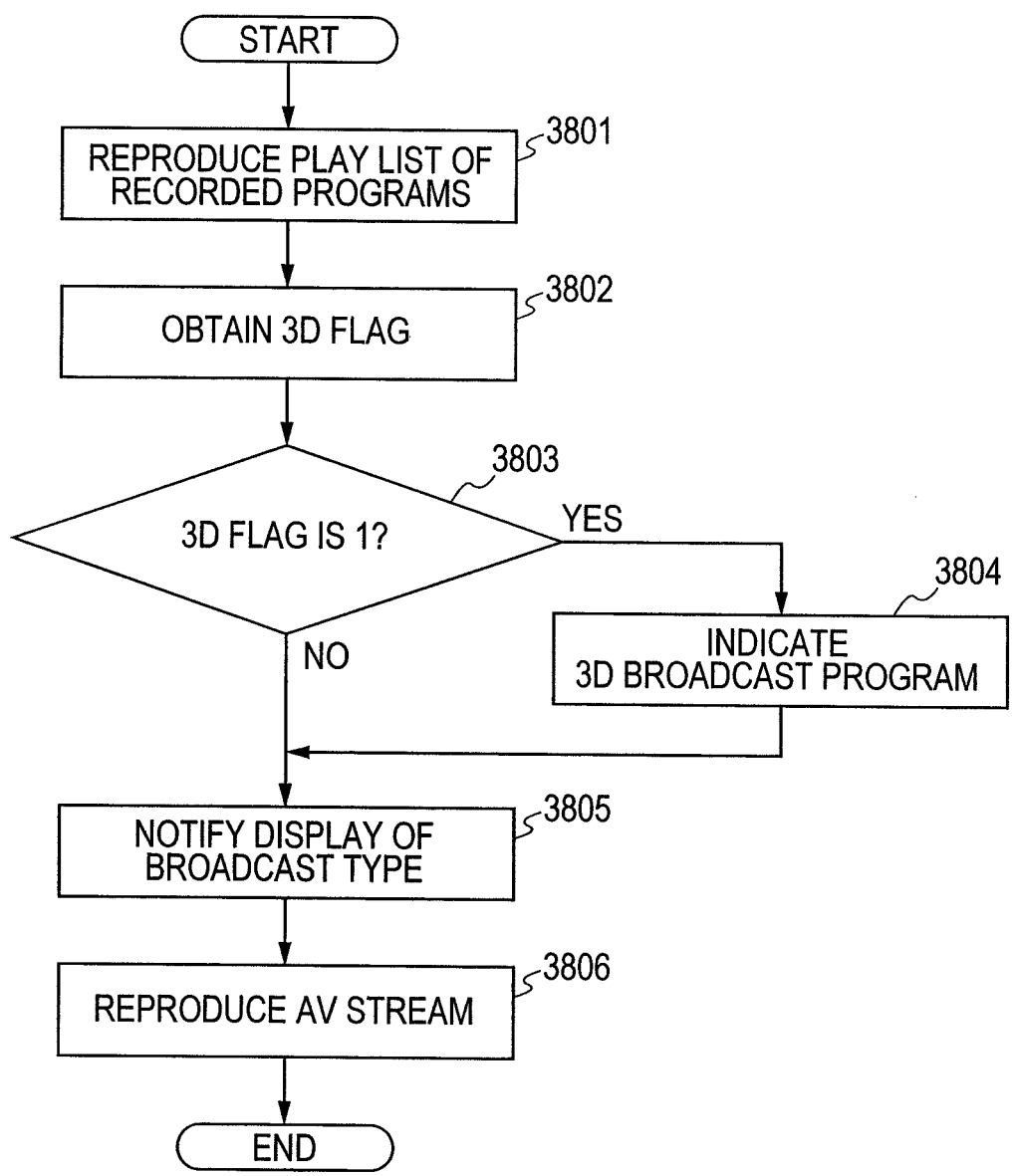
FIG. 38 is a flowchart showing 3D flag reproduction processing.

Further, the flow of 3D flag reproduction processing will be described with reference to FIG. 38.

When the user selects a desired program from a recorded program list in the recorder, the play list file 141 corresponding to the program as a reproduction subject is reproduced from a recording medium with the drive 1101 (step 3801).

The CPU 1161 obtains the 3D flag 331 of the user interface application information 206 from the reproduced play list file 141 (step 3802), and determines whether or not the 3D flag 331 is 1 (step 3803).

When the 3D flag 331 is 1, the user is informed that the program has a 3D content by OSD (On Screen Display), turn-on of an LED indicator of the recorder main body or the like (step 3804).

Further, when transmission of 3D content is notified to the display connected to the recorder (step 3805), the display changes to a 3D display mode.

Thereafter, the AV stream file is reproduced (step 3806).

Figure 12:
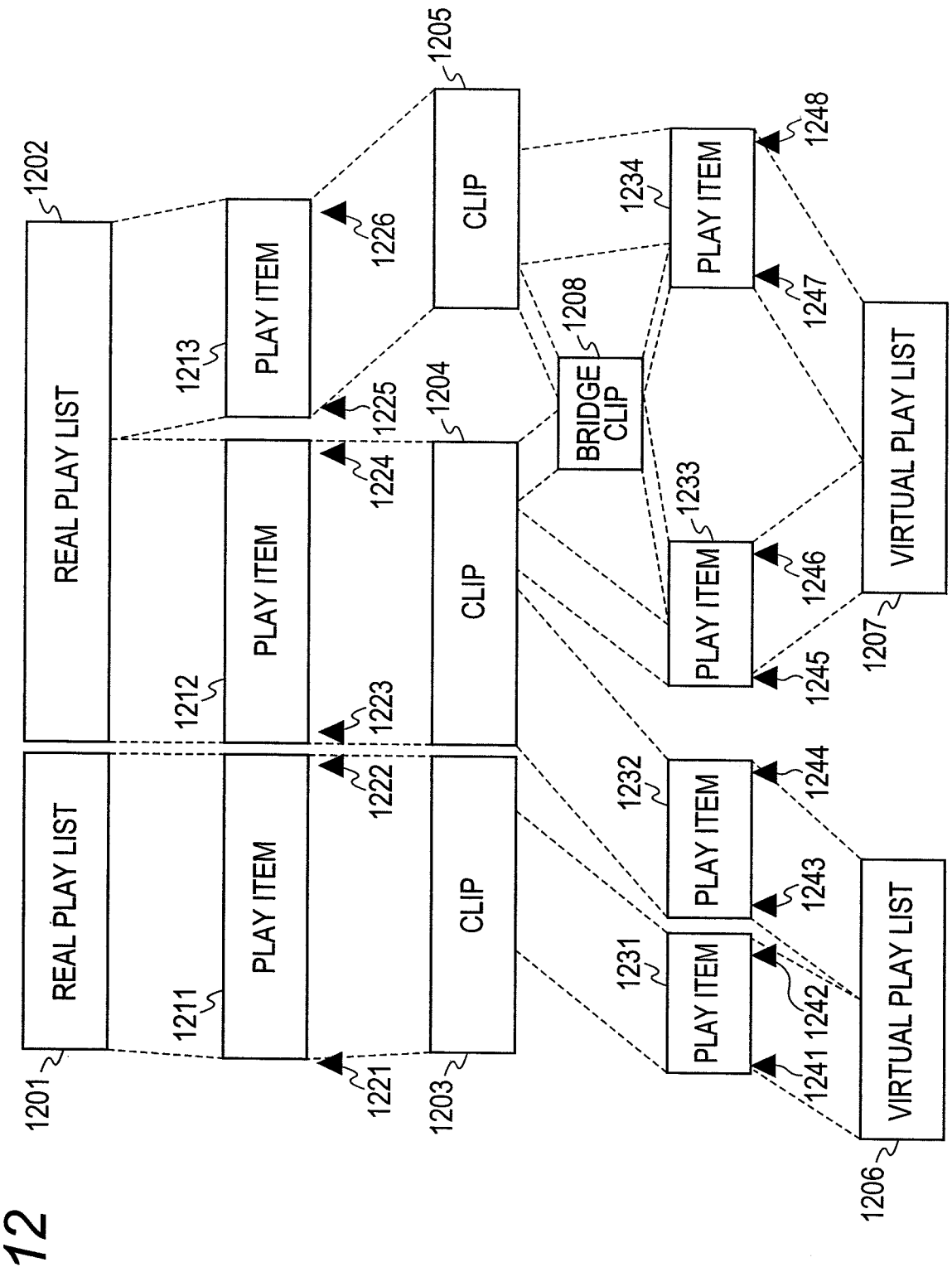
FIG. 12 illustrates a real play list and a virtual play list.

FIG. 12 illustrates a real play list and a virtual play list according to an embodiment of the present invention.

Numeral 1201 denotes the first real play list referring to a play item 1211.

Numeral 1202 denotes the second real play list referring to a play item 1212 and a play item 1213.

Numeral 1211 denotes the first play item referring to a clip 1203.

Numeral 1212 denotes the second play item referring to a clip 1204.

Numeral 1213 denotes the third play item referring to a clip 1205.

Numeral 1203 denotes the first clip.

Numeral 1204 denotes the second clip.

Numeral 1205 denotes the third clip.

Numeral 1231 denotes the fourth play item referring to a part of the clip 1203.

Numeral 1232 denotes the fifth play item referring to a part of the clip 1204.

Numeral 1233 denotes the sixth play item referring to a part of the clip 1204 and a part of a bridge clip 1208.

Numeral 1234 denotes the seventh play item referring to a part of the bridge clip 1208 and a part of the clip 1205.

Numeral 1206 denotes the first virtual play list referring to the play item 1231 and the play item 1232.

Numeral 1207 denotes the second virtual play list referring to the play item 1233 and the play item 1234.

Numeral 1208 denotes the first bridge clip re-encoded from data at the end of the clip 1204 and data at the head of the clip 1205.

Next, the play list will be described.

The play list assists the user to easily edit clip reproduction time of a clip to be reproduced. For example, it is possible to perform cut and paste editing without movement, copying or deletion of clip file entity (including partial movement, partial copying and partial deletion). The play list is a set of a series of reproduction sections each referred to as a play item in a clip. The play item is represented with a pair of in point and out point. The IN point and the OUT point are time information indicating the position on the time axis of the clip. Accordingly, it can be considered that the play list is a set of play items. Further, the IN point means the reproduction start position of a reproduction section, and the out point, the reproduction end position of the reproduction section. The play lists include two types of play lists, i.e., a real play list and a virtual play list.

Next, the real play list will be described.

The real play list is used for a clip AV stream file but not used for a bridge clip AV stream file. The real play list is used for reference to a part of a clip.

By the reference to the real play list, data space corresponding to the reference destination clip (part of the clip) is consumed on the disc, and when the real play list is deleted, the reference destination clip (part of the clip) is deleted.

Next, the virtual play list will be described.

The real play list is used for a clip AV stream file and a bridge clip AV stream file. The virtual play list has no data entity when it is used for a clip AV stream file, while it has a data entity when it is used for a bridge clip AV stream file. When a virtual play list not using a bridge clip AV stream is deleted, there is no change in the clip.

On the other hand, when a virtual play list using a bridge clip AV stream file is deleted, the clip AV stream file and clip information filed related to the clip AV stream file are not changed, but the bridge clip AV stream file and clip information file related to the bridge clip AV stream file are deleted.

The clip is a management unit for internal control of the player or the recorder and is not displayed on the user interface. Only a play list is displayed for the user.

As the play list operations, the followings are given.

Regarding real play list operations, the followings are given.

(1) Generation of Real Play List

A real play list initially generated upon recording of a broadcasted program becomes a real play list for reference to the entire recorded clip.

Figures 13, 14:
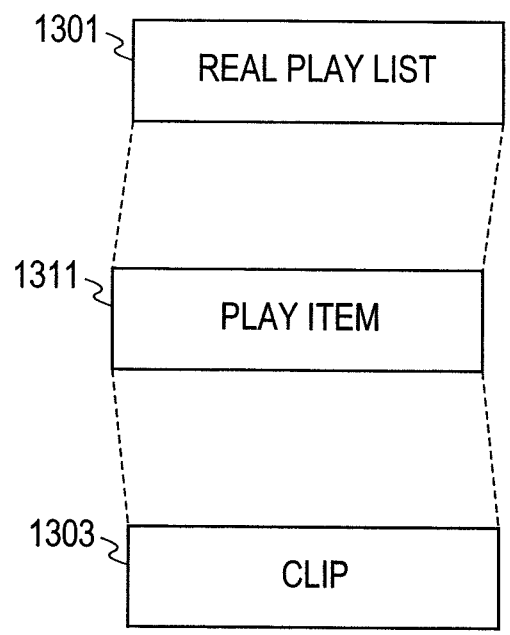
FIG. 13 illustrates an example of generation of the real play list.
FIG. 14 is a table showing a 3D flag in a generated real play list.

FIG. 13 illustrates an example of generation of the real play list.

Numeral 1301 denotes a real play list referring to a play item 1311. It is generated as one play list file upon new recording.

Numeral 1311 denotes the play item referring to a clip 1303.

Numeral 1303 denotes the clip generated as one clip information file and one AV stream file upon new recording.

FIG. 14 is a table showing a 3D flag in a generated real play list.

Numeral 1451 denotes a table showing set value of the 3D flag in the real play list 1301 upon new recording. When the content of the clip 1303 is a 3D content, 1 is set, otherwise, 0 is set.

(2) Division of Real Play List

When one real play list is divided into two real play lists, no change occurs in the clip itself.

Figure 15:
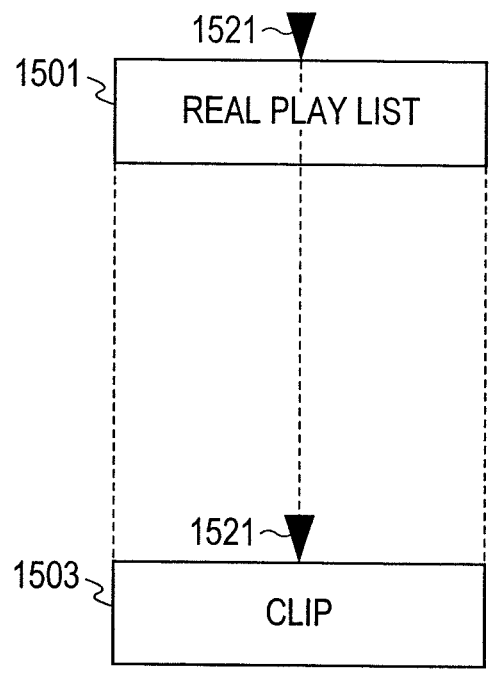
FIG. 15 illustrates an example of division of a real play list.
Figure 16:
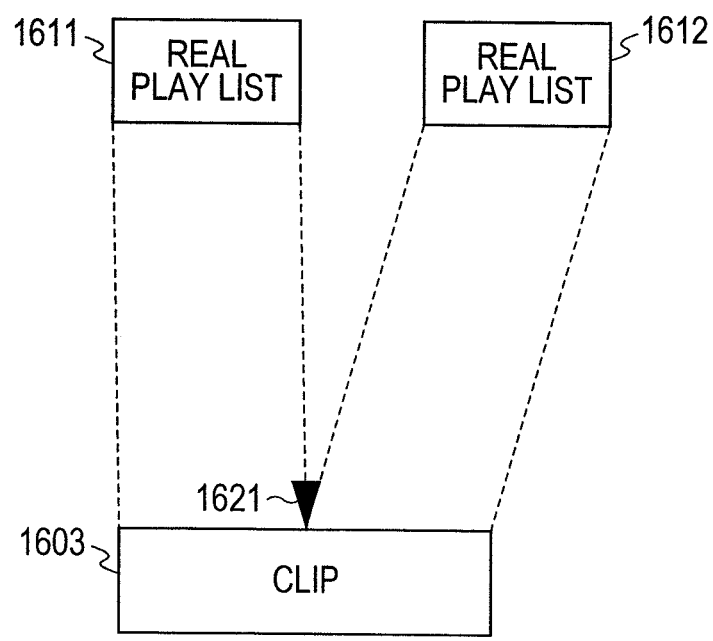
FIG. 16 illustrates another example of division of a real play list.

FIGS. 15 and 16 illustrate examples of division of a real play list.

Numeral 1501 denotes a real play list referring to a clip 1503 via an unshown play item.

Numeral 1503 denotes the clip.

Numeral 1521 denotes a division point showing an example of dividing at about the center of a real play list 1401.

Numeral 1611 denotes a real play list referring to a part of a clip 1603 (a part on the left side from a division point 1621) via an unshown play item.

Numeral 1603 denotes the clip similar to the clip 1503.

Numeral 1612 denotes a real play list referring to a part of the clip 1603 (a part on the right side from the division point 1621) via an unshown play item.

Figures 17, 18:
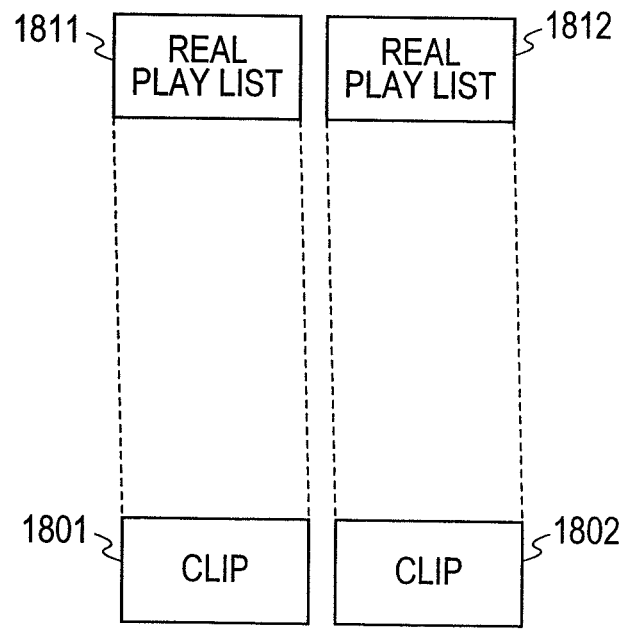
FIG. 17 is a table showing the 3D flag before and after the division of the real play list.
FIG. 18 illustrates an example of connection of real play lists.

FIG. 17 is a table showing the 3D flag before and after the division of the real play list.

Numeral 1751 denotes a table showing 3D flag set values in the real play lists 1501, 1611 and 1612 before and after the division. When the contents of the clip 1503 are 3D contents, 1 is set, otherwise, 0 is set.

(3) Connection of Real Play Lists

When two real play lists are connected to one new real play list, no change is caused in the clip itself.

Figures 19, 20:
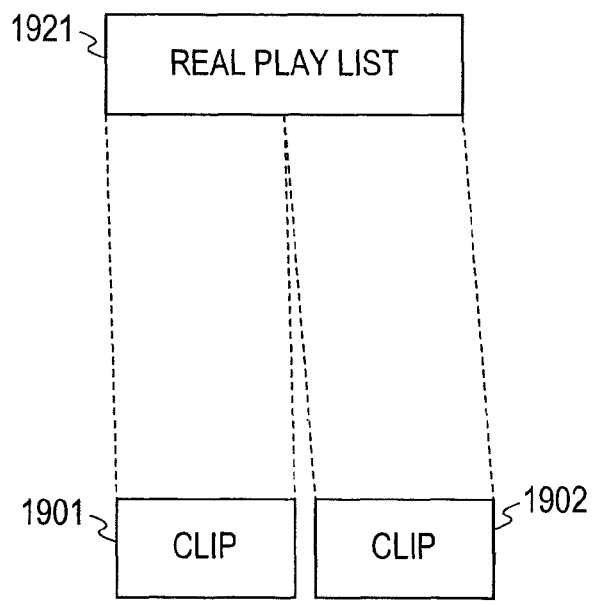
FIG. 19 illustrates an example of the connection of real play lists.
FIG. 20 is a table showing the 3D flag before and after the connection of the real play lists.

FIGS. 18 and 19 illustrate examples of connection of the real play lists.

Numeral 1811 denotes a real play list referring to a clip 1801 via an unshown play item.

Numeral 1801 denotes the clip.

Numeral 1812 denotes a real play list referring to a clip 1802 via an unshown play item.

Numeral 1802 denotes the clip.

Numeral 1901 denotes a clip similar to the clip 1801.

Numeral 1902 denotes a clip similar to the clip 1802.

Numeral 1921 denotes a real play list referring to the clip 1901 and the clip 1902 via an unshown play item.

FIG. 20 is a table showing the 3D flag before and after the connection of the real play lists.

Numeral 2051 denotes a table showing 3D flag set values in the real play lists 1811, 1812 and 1921 before and after the connection. When the contents of the clip 1801 and the clip 1802 are 3D contents, 1 is set, while the contents are not 3D contents, 0 is set. When the content of only one of these clips is a 3D content, connection is prohibited.

Further, as another embodiment, it may be arranged such that connection is not prohibited, but user is warned of mixture of 3D and non-3D contents in the play list, and when the user selects execution of connection, 1 is set in the 3D fag to generate a connected real play list.

Figure 39:
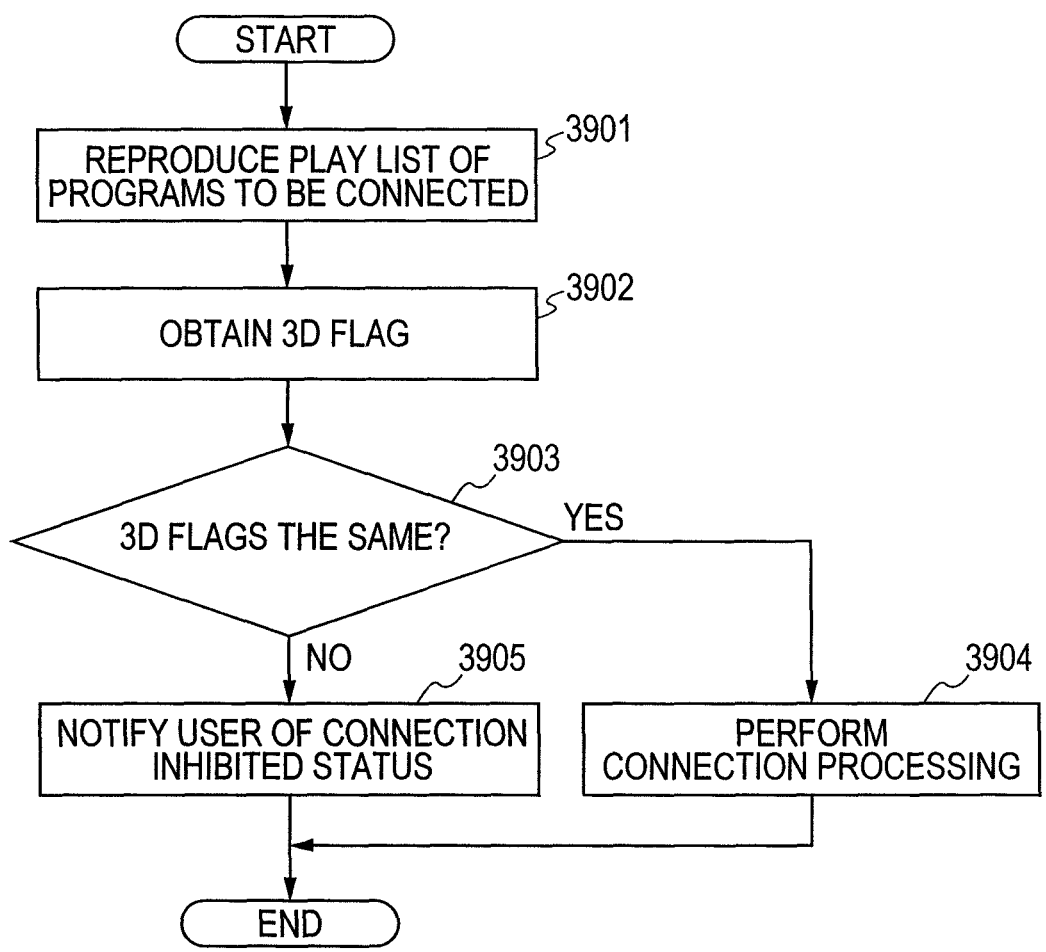
FIG. 39 is a flowchart showing real play list connection processing.

FIG. 39 is a flowchart showing real play list connection processing.

When editing to connect two real play lists is started, play lists of connection subject programs are reproduced from the drive 1101 (step 3901) and 3D flags are obtained (step 3902).

The CPU 1161 determines whether or not the 3D flag values are the same (step 3903). When the values are both 1 or both 0, performs the connection processing (step 3904), otherwise, inform the user of prohibition of the connection processing of these play lists (step 3905). Then process ends.

(4) Deletion of Entire Real Play List

When one real play list is entirely deleted, a range referred to among clips as reference destinations are deleted.

Figures 21, 22:
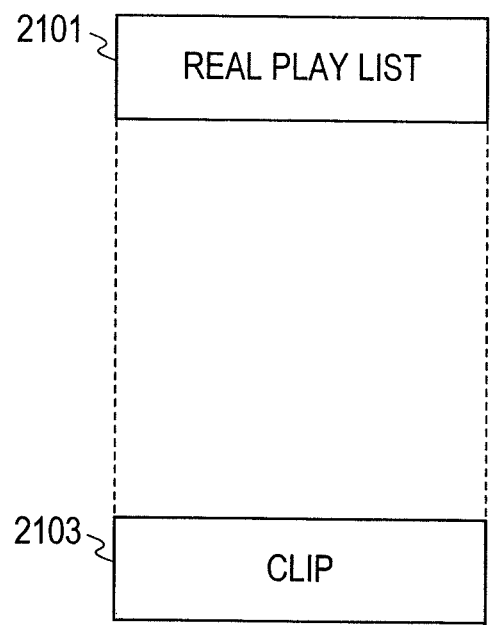
FIG. 21 illustrates an example of deletion of a real play list.
FIG. 22 is a table showing an example of the 3D flag before and after the deletion of the real play list.

FIG. 21 illustrates an example of deletion of the real play list.

Numeral 2101 denotes a real play list to refer to a clip 2103 via an unshown play item.

Numeral 2103 denotes the clip.

FIG. 22 is a table showing an example of the 3D flag before and after the deletion of the real play list.

Numeral 2251 denotes a table showing 3D flag set values in the real play list 1601 before and after deletion of the real play list. Whether the content of the clip 2103 is 3D or not, the real play list 2101 can be deleted.

(5) Deletion of Part of Real Play List

When a part of a clip referred to from a real play list is deleted, a necessary part is left by changing the play item, however, a part not referred to in the clip is deleted.

Figure 23:
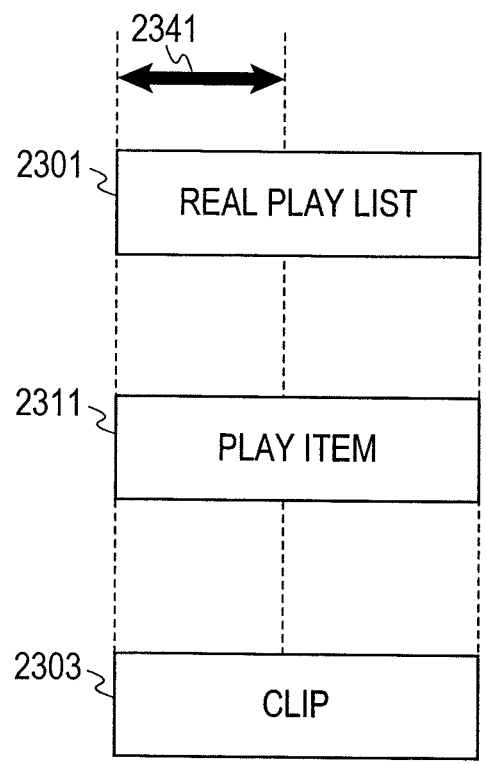
FIG. 23 illustrates an example of partial deletion of the head part of a real play list.
Figure 24:
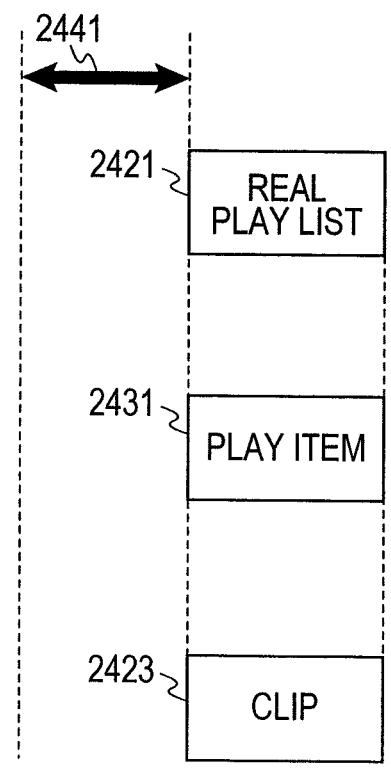
FIG. 24 illustrates another example of the partial deletion of the head part of the real play list.

FIGS. 23 and 24 illustrate examples of partial deletion of the head of a real play list.

Numeral 2301 denotes a real play list referring to a play item 2311.

Numeral 2311 denotes the play item referring to a clip 2303.

Numeral 2303 denotes the clip.

Numeral 2421 denotes a real play list referring to a play item 2431.

Numeral 2441 is a deletion range. In this example, a part corresponding to the left side of the real play list 2301 is partially deleted.

Numeral 2431 denotes the play item referring to a clip 2423.

Numeral 2423 denotes the clip.

Figures 25, 26:
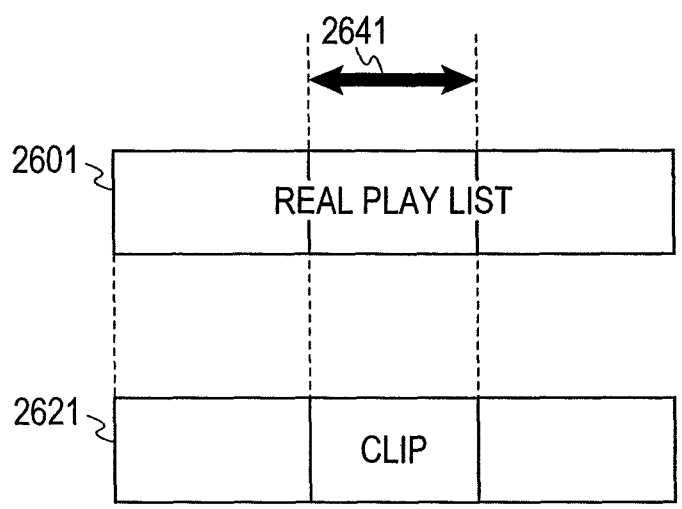
FIG. 25 is a table showing the 3D flag before and after the partial deletion of the head part of the real play list.
FIG. 26 illustrates an example of the partial deletion of an intermediate part of a real play list.

FIG. 25 is a table showing the 3D flag before and after the partial deletion of the head part of a real play list.

Numeral 2551 denotes a table showing 3D flag set values in the real play lists 2301 and 2421 before and after partial deletion. When the content of the clip 2303 is 3D, 1 is set, otherwise, 0 is set.

When an intermediate part of a clip AV stream is edited and deleted, the remaining parts are connected in one clip file.

Figures 27, 28:
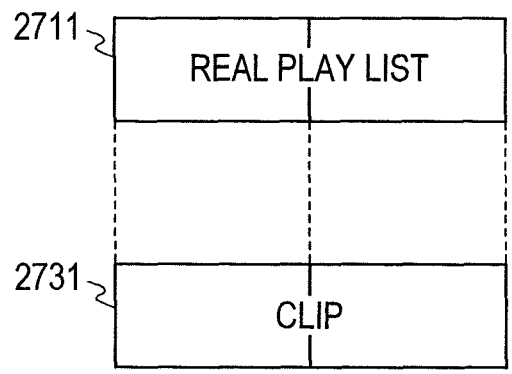
FIG. 27 illustrates another example of the partial deletion of the intermediate part of a real play list.
FIG. 28 is a table showing the 3D flag in the example of the partial deletion of the intermediate part of the real play list.

FIGS. 26 and 27 illustrate examples of the partial deletion of the intermediate part of a real play list.

Numeral 2601 denotes a real play list referring to a clip 2621 via an unshown play item.

Numeral 2621 denotes the clip.

Numeral 2641 denotes a deletion range. In this example, a part corresponding to an intermediate region of the real play list 2601 is partially deleted (=middle part deletion).

Numeral 2711 denotes a real play list referring to a clip 2731 via an unshown play item.

Numeral 2731 denotes the clip.

FIG. 28 is a table showing the 3D flag in the example of the partial deletion of the intermediate part of a real play list.

Numeral 2851 denotes a table showing 3D flag values in the real play lists 2601 and 2711 before and after the partial deletion. When the content of the clip 2621 is 3D, 1 is set, otherwise, 0 is set.

When the real play list and the clip used in the real play list are changed, unconformity might occur between the real play list and a virtual play list using the same clip. In this case, the following operation is performed.

a) Warning to a user and confirmation are performed. That is, when parts of the real play list and the clip are deleted, the virtual play list using the same part of the clip might also be deleted.

b) Otherwise, the virtual play list file is left without any change, and only a play item, for which a part of the clip referred to from the virtual play list and has been deleted, is deleted.

The operations regarding the virtual play list are as follows.

(1) Assemble Editing

As shown in FIGS. 29 to 36, it is possible to generate a play item which the user desires to reproduce, and connect the play item to another play item using the virtual play list.

By generating a bridge clip file, it is possible to realize reproduction with smooth seam at a connection point. To perform reproduction of seamlessly connected MPEG video streams, generally, a very few pictures around a connection point are re-encoded and a bridge clip is generated.

With this processing, it is unnecessary to change an initial clip AV stream file and its clip information file.

Figure 29:
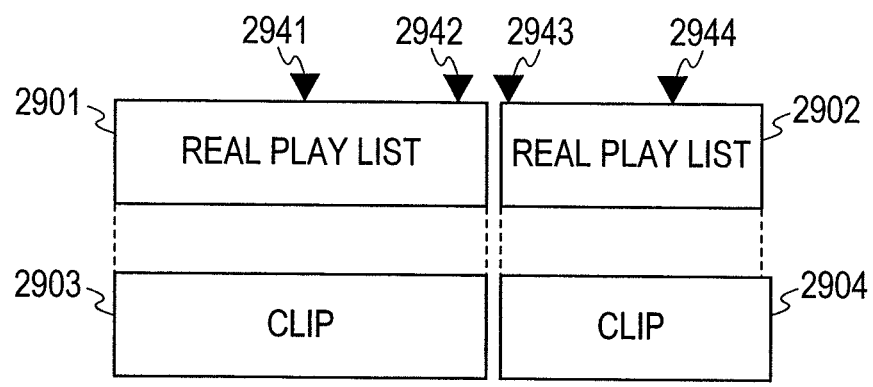
FIG. 29 illustrates an example of assemble editing (non-seamless connection between two play items)
Figure 30:
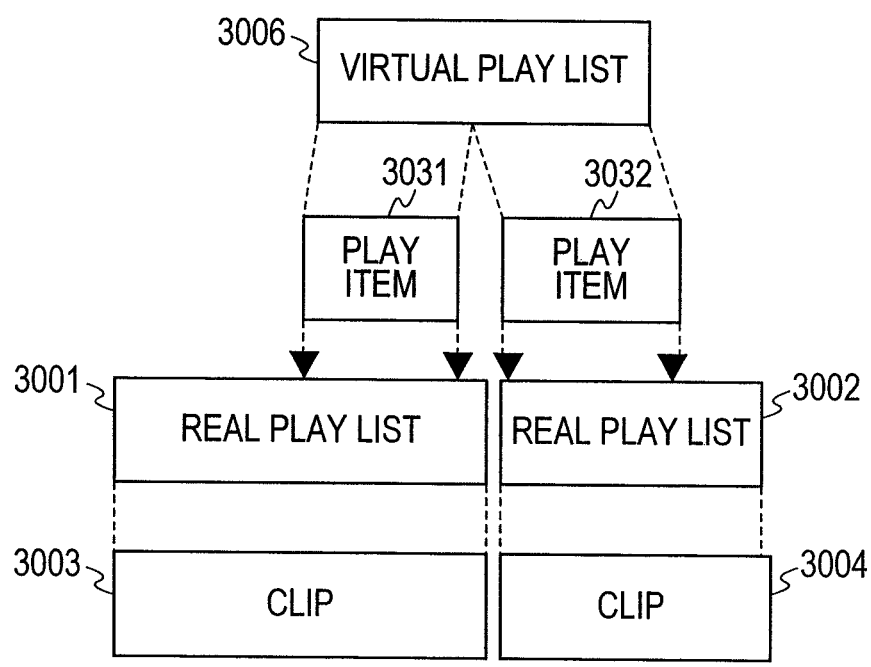
FIG. 30 illustrates another example of the assemble editing (non-seamless connection between two play items)

FIGS. 29 and 30 illustrate examples of assemble editing (non-seamless connection between two play items).

Numeral 2901 denotes a real play list referring to a clip 2903 via an unshown play item.

Numeral 2903 denotes the clip.

Numeral 2902 denotes a real play list referring to a clip 2904 via an unshown play item.

Numeral 2904 denotes the clip.

Numeral 2941 denotes an IN point which is IN time of a play item 3031 registered in a virtual play list.

Numeral 2942 denotes an OUT point which is OUT time of the play item 3031 registered in the virtual play list.

Numeral 2943 denotes an IN point which is IN time of a play item 3032 registered in the virtual play list.

Numeral 2944 denotes an OUT point which is OUT time of the play item 3032 registered in the virtual play list.

Numeral 3006 denotes a virtual play list referring to the play item 3031 and the play item 3032.

Numeral 3031 denotes the play item referring to a part of a real play list 3001.

Numeral 3032 denotes the play item referring to a part of a real play list 3002.

Numeral 3003 denotes a clip similar to the clip 2903.

Numeral 3004 denotes a clip similar to the clip 2904.

FIG. 31 is a table showing the 3D flag before editing in the example of the assemble editing (non-seamless connection between two play items).

Numeral 3151 denotes a table showing 3D flag set values in the real play lists 2901 and 2902 before virtual play list generation. When the contents of the clips 2903 and 2904 are respectively 3D, 1 is set, otherwise, 0 is set.

FIG. 32 is a table showing the 3D flag after the example of the assemble editing (non-seamless connection between two play items).

Numeral 3252 denotes a 3D flag set values in a generated virtual play list 3006. When the contents of the clip 3003 and the clip 3004 are 3D, 1 is set, while when the contents of the clip 3003 and the content of the clip 3004 are not 3D, 0 is set. When the content of one of the clips 3003 and 3004 is 3D, warning of generation of a virtual play list where 3D and non-3D contents are mixed is issued to the user. Then when the user selects generation, 1 is set.

Further, as another embodiment, it may be arranged such that the user is informed of prohibition of generation of a virtual play list where 3D and non-3D contents are mixed, to prohibit generation.

Figure 40:
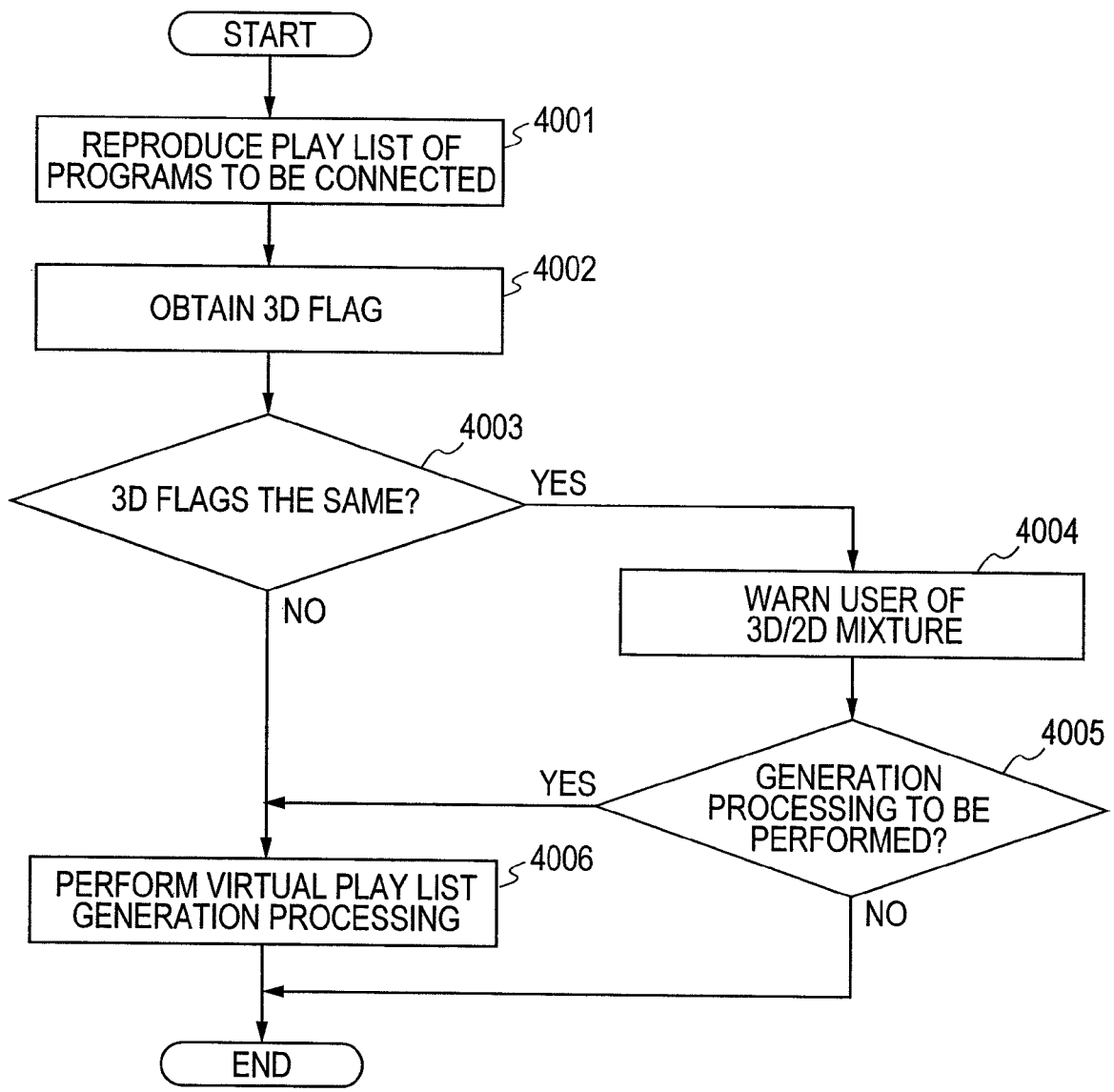
FIG. 40 is a flowchart showing the assemble editing (non-seamless connection between two play items) processing.

FIG. 40 is a flowchart showing assemble editing (non-seamless connection between two play items) processing.

When editing to connect two real play lists in one virtual play list is started, the play lists of the connection subject programs are reproduced from the drive 1101 (step 4001), to obtain the respective 3D flags (step 4002).

The CPU 1161 determines whether or not the 3D flag values are the same (step 4003). When the 3D flag values are both 1 or 0, virtual play list generation processing is performed (step 4006), otherwise, warning that a virtual play list where these 2D and 3D contents are mixed is generated is issued to the user (step 4004). When the user selects execution of generation (step 4005), the virtual play list generation processing is performed (step 4006). The generated virtual play list is recorded on a disc, and the process ends. When the user does not select execution of the generation processing, the process ends.

Figure 33:
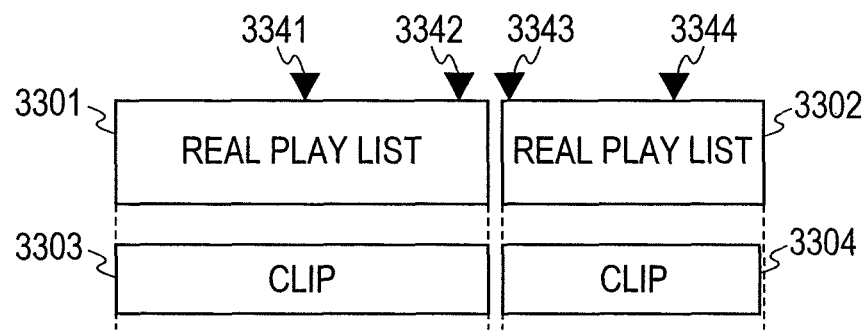
FIG. 33 illustrates another example of the assemble editing (seamless connection between two play items)
Figure 34:
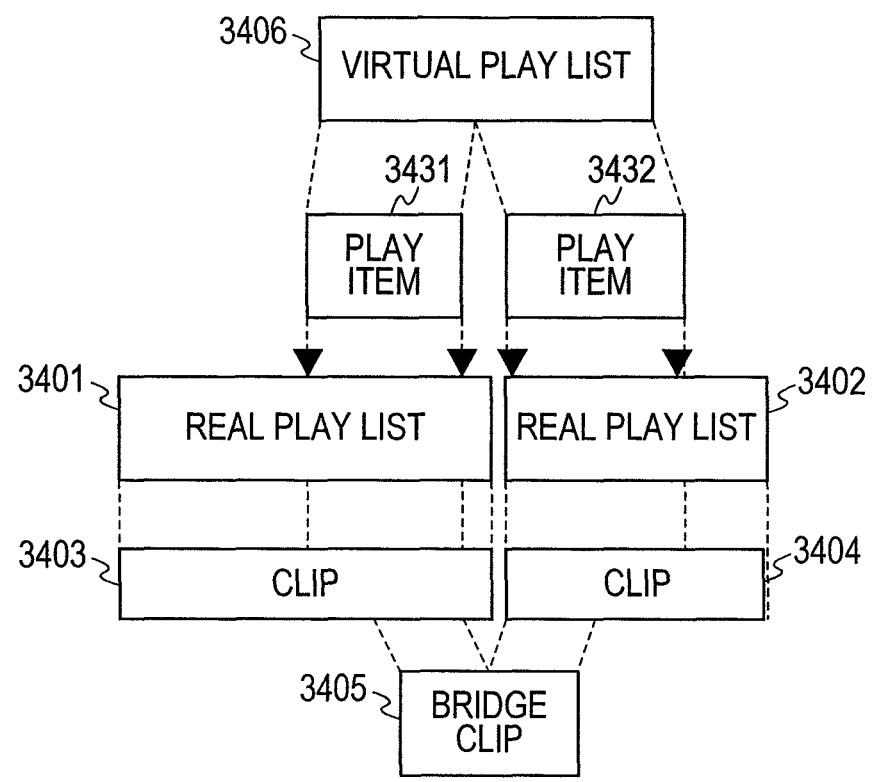
FIG. 34 illustrates another example of the assemble editing (seamless connection between two play items)

FIGS. 33 and 34 illustrate other examples of the assemble editing (seamless connection between two play items).

Numeral 3301 denotes a real play list referring to a clip 3303 via an unshown play item.

Numeral 3303 denotes the clip.

Numeral 3302 denotes a real play list referring to a clip 3304 via an unshown play item.

Numeral 3304 denotes the clip.

Numeral 3341 denotes an IN point which is IN time of a play item 3431 registered in a virtual play list.

Numeral 3342 denotes an OUT point which is OUT time of the play item 3431 registered in the virtual play list.

Numeral 3343 denotes an IN point which is IN time of a play item 3432 registered in the virtual play list.

Numeral 3344 denotes an OUT point which is OUT time of the play item 3432 registered in the virtual play list.

Numeral 3406 denotes the virtual play list referring to the play item 3431 and the play item 3432.

Numeral 3431 denotes the play item referring to a part of the real play list 3401.

Numeral 3432 denotes the play item referring to a part of the real play list 3402.

Numeral 3403 denotes a clip similar to the clip 3303.

Numeral 3404 denotes a clip similar to the clip 3304.

FIG. 35 is a table showing the 3D flag before the editing in the one example of the assemble editing (seamless connection between two play items).

Numeral 3551 denotes a table showing 3D flag set values in the real play lists 3301 and 3302 before generation of the virtual play list. When the contents of the clips 3303 and 3304 are 3D, 1 is set, while when the contents of the clips 3403 and 3404 are not 3D, 0 is set.

FIG. 36 is a table showing 3D flag values after the editing in the one example of the assemble editing (seamless connection between two play items).

Numeral 3652 is a table showing 3D flag set values in the virtual play list 3406 after virtual play list generation. When the contents of the clips 3404 and 3404 are 3D, 1 is set. When the contents of the clips 3404 and 3404 are not 3D, 0 is set. When one of the contents of the clips 3403 and 3404 is 3D, the virtual play list generation is prohibited.

Further, as another embodiment, it may be arranged such that, first, the user is warned of generation of a virtual play list where 3D contents and non-3D contents are mixed, then, when the user selects generation, a virtual play list in which the 3D flag is set to 1 is generated.

Figure 41:
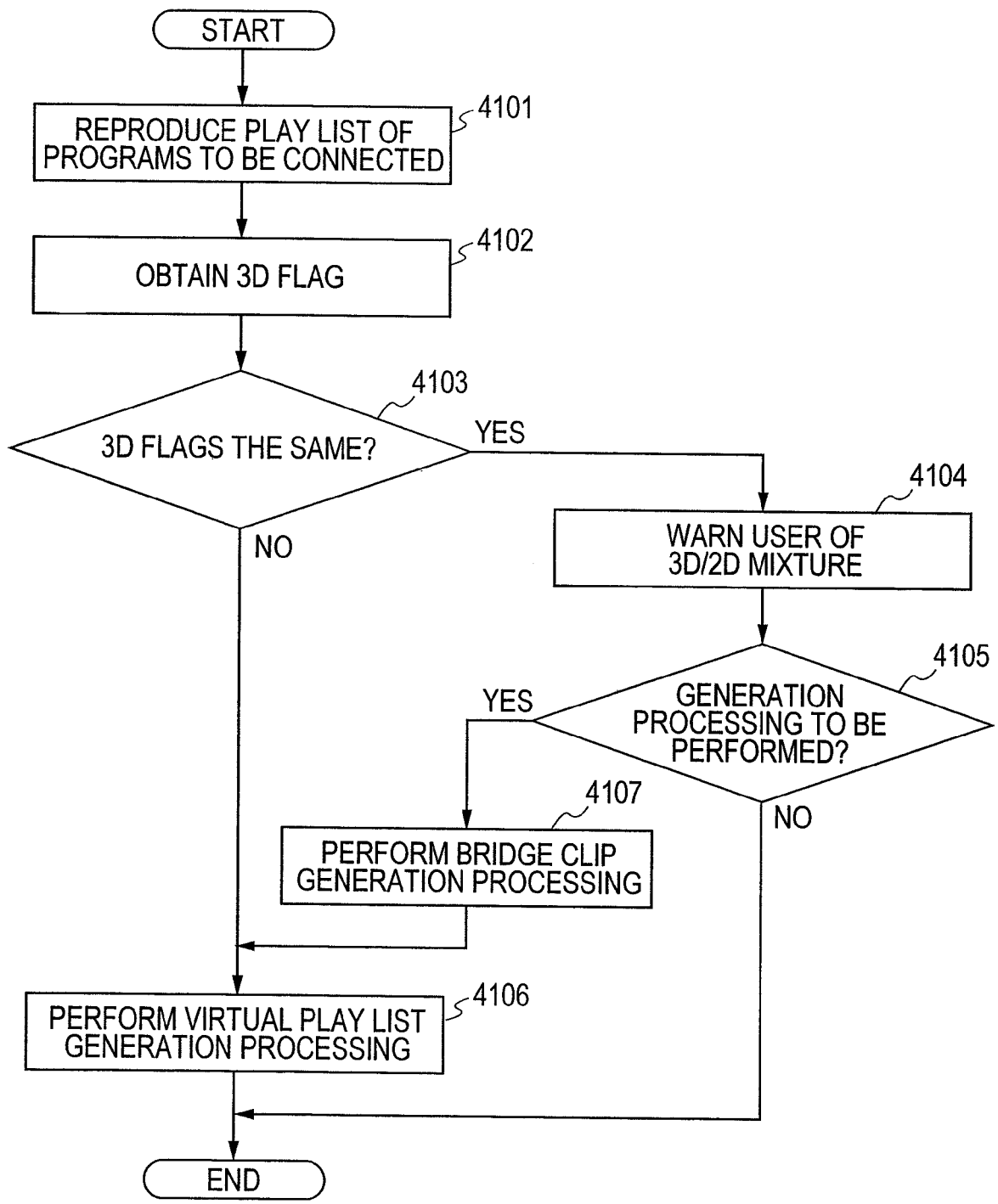
FIG. 41 is a flowchart showing the assemble editing (seamless connection between two play items) processing.

FIG. 41 is a flowchart showing other assemble editing (non-seamless connection between two play items) processing.

When editing to connect two real play lists in a virtual play list is started, the playlists of the connection subject programs are reproduced from the drive 1101 (step 4101), to obtain the respective 3D flags (step 4102).

The CPU 1161 determines whether or not the 3D flag values are the same (step 4103). When the both 3D flag values are 1 or 0, the virtual play list generation processing is performed (step 4106), otherwise, the user is warned of generation of a virtual play list where these 2D and 3D contents are mixed (step 4104). When the user selects execution of the generation processing (step 4105), bridge clip generation processing is performed (step 4107), the virtual play list generation processing is performed (step 4106), and the generated virtual play list is recorded on the disc. Then the process ends. When the user does not select execution of the generation processing, the process ends.

(2) Virtual Play List Re-Editing

An editing method to change the IN point or OUT point of a play item in a virtual play list by adding, inserting a play item to the virtual play list, or deleting a play item in the virtual play list, can be considered.

In this case, when the IN point and OUT point to refer to a bridge clip are changed by the user's operation, the recorder warns the user of necessity to delete the existing bridge clip and generate a new bride clip. When the user's acknowledgement has been obtained, the processing is performed.

(3) Virtual Play List Deletion

The entire virtual play list is deleted.

(4) After Recording Editing in Virtual Play List

It is possible to record additional audio information (after recording) with respect to a virtual play list. The additional audio information can be added as a sub path.

As an operation common to virtual play list and real play list, the following operation can be given.

(1) Change of Play List Reproduction Order

This operation is realized by changing a play list table defining a play list reproduction order. The clip itself is not changed with this operation.

Note that the present invention is not limited to the above-described embodiments, but includes various modifications. For example, the above-described embodiments have been described in detail so as to assist understanding of the present invention and the invention is not limited to embodiments having all the described constituent elements. Further, it is possible to replace a part of the constituent elements of an embodiment with those of another embodiment. Further, it is possible to add the constituent elements of an embodiment to those of another embodiment. Further, regarding a part of constituent elements of an embodiment, it is possible to perform addition, deletion, and/or replacement using other constituent elements.

Further, a part or all the above-described constituent elements, functions, processors, processing units and the like may be realized as hardware by designing them as e.g. an integrated circuit. Further, the above-described constituent elements, functions, processors, processing units and the like may be realized as software by interpreting and executing a program to realize the respective functions by a processor. Information on the programs, table, files and the like to realize the respective functions can be stored on a recording device such as a memory, a hard disk, or an SSD (Solid State Drive) or a recording medium such as an IC card, an SD card or a DVD.

Further, the control lines and information lines, considered as necessary lines for the purpose of explanation, are shown, but all the control lines and information lines as a product are not necessarily shown. It may be considered that actually almost all the constituent elements are interconnected.

While several embodiments have been shown and described in accordance with the present invention, it should be understood that disclosed embodiments are susceptible of changes and modifications without departing from the scope of the invention. Therefore, it is not intended that the invention is not bound by the details shown and described herein but intended that it covers all such changes and modifications that fall within the ambit of the appended claims.

What is claimed is:

1. A recording method for edited play list files on a recording medium, comprising:
   a recording step of recording a play list file defining a reproduction order of information recorded on the recording medium; and
   a connection step of connecting the play list files for editing the play list files, when a plurality of the play list files are recorded on the recording medium;
   wherein the play list file includes user interface application information and play list information, and the interface application information includes a 3D flag indicating whether or not a 3D content is included in the play list file,
   and wherein upon the editing connection of the play list files,
   when a 3D flag indicating that a 3D content is included is recorded in a play list file, while a 3D flag indicating that a 3D content is not included is recorded in another play list file, the editing connection of the play list files is prohibited.

2. A recording method as claimed in claim 1, wherein the connecting the play list files for editing the play list files, is more specifically a user-editing connecting of the play list files.

3. A recording apparatus for editing play list files on a recording medium, comprising:
   a recording unit that records a play list file defining a reproduction order of information recorded on the recording medium, and when a plurality of play list files are recorded on the recording medium, connects the play list files for editing the play list files; and
   a controller that controls the recording unit,
   wherein the play list file includes user interface application information, and the interface application information includes a 3D flag indicating whether or not a 3D content is included in the play list file,
   and wherein upon the editing connection of the play list files,
   when a 3D flag indicating that a 3D content is included is recorded in a play list file, while a 3D flag indicating that a 3D content is not included is recorded in another play list file, the controller controls the recording unit to prohibit the editing connection of the play list files.

4. A recording apparatus as claimed in claim 3, wherein the connects the play list files for editing the play list files, is more specifically a user-editing connecting of the play list files.

* * * * *